United States Patent [19]

Brooks et al.

[11] Patent Number: 5,222,193
[45] Date of Patent: Jun. 22, 1993

[54] TRAINING SYSTEM FOR NEURAL NETWORKS AND THE LIKE

[75] Inventors: William O. Brooks, Aloha; Alan J. Cossitt, Portland; Richard K. Helm, Aloha; Louis J. Johnson, Beaverton; Raymond E. McNamee, Boring, all of Oreg.

[73] Assignee: Intel Corporation, Santa Clara, Calif.

[21] Appl. No.: 634,031

[22] Filed: Dec. 26, 1990

[51] Int. Cl.[5] ............................................. G06F 15/18
[52] U.S. Cl. ...................................... 395/23; 395/24; 395/27
[58] Field of Search ............................. 395/23, 24, 27

[56] References Cited

U.S. PATENT DOCUMENTS

| | | | |
|---|---|---|---|
| 4,807,168 | 2/1989 | Moopenn et al. | 364/602 |
| 4,866,645 | 9/1989 | Lish | 364/602 |
| 5,087,826 | 2/1992 | Holler et al. | 307/201 |

OTHER PUBLICATIONS

Eberhardt et al., "Design of Parallel Hardware Neural Network Systems from Custom Analog VLSI 'Building Block' Chips", IJCNN, 1989, II, 183–190.
Holler et al., "An Electrically Trainable Artificial Neural Network (ETANN) with 10240 Floating Gate Synapses", Proc. Intl. Conf. Neural Networks, 1989, II, 191–196.
McClelland et al., "Explorations in Parallel Distributed Processing", MIT Press, 1988, pp. 1–3, 121–150, 246, 251.

Primary Examiner—Michael R. Fleming
Assistant Examiner—Robert W. Downs
Attorney, Agent, or Firm—Blakely, Sokoloff, Taylor & Zafman

[57] ABSTRACT

A means and method for training an electronic network of analog cells. A generic universal programmer interface (GUPI) is provided to enable connection of an adaptor to a host computer via a personal computer personal programmer (PCPP) for training an ETANN chip. An opening in the top of the GUPI provides for installation of the adaptor. The adaptor of the present invention plugs into the GUPI module to provide for connecting either an ETANN chip or a Confidence Test Module (CTM) for access by the user via the host computer. A target socket located on the top surface of the adaptor allows the user to physically connect the ETANN chip or the CTM to adapter of the present invention. The adaptor provides the resources needed for training an ETANN in several modes including: digital to analog conversion for driving the ETANN's analog input pins; a single analog to digital converter with an 80 channel analog multiplexer for measuring the ETANN's analog outputs; neuron perturbation circuitry; synapse current measurement circuitry; neuron sum measurement circuitry; $V_{PP}$ management circuitry; a binary searching synapse weight measurement circuit; isolation switches and the logic necessary to connect all these resources to the ETANN and the GUPI base. The present invention also includes host computer software necessary to control the operation of the adapter.

20 Claims, 4 Drawing Sheets

TRAINING SYSTEM FOR NEURAL NETWORKS AND THE LIKE

FIELD OF THE INVENTION

The present invention pertains to the field of electronic associative networks. Specifically, the present invention pertains to training electronic analog cells in a network.

BACKGROUND OF THE INVENTION

Circuit models have been developed to emulate an associative network of neurons as in a human brain. One such electronic implementation of a neuron is described in "A Neuromorphic VLSI Learning System", by Alspector and Allen, Advanced Research in VLSI, *Proceedings of the* 1987 *Stanford Conference*. In general, such systems provide an electronic representation of a neuron with many weighted inputs, a summing portion and a computational portion for determining a desired functional outcome given the weighted inputs. These neurons are coupled together to form an associative network or neural network. One such prior art neural network is shown in FIG. 1 of the patent "Semiconductor Cell for Neural Network and the Like", U.S. Pat. No. 5,055,897 issued Oct. 8, 1991 and assigned to the assignee of the present invention. Another related patent application is entitled "Method of Increasing the Accuracy of an Analog Neural Network and the Like", Ser. No. 07/634,033, filed Dec. 26, 1990, and divisional application Ser. No. 07/865,451, filed Apr. 9, 1992 both assigned to the assignee of the present invention.

Training a network is necessary to make the network produce a desired output for a given input. In networks like a neural network, training the network includes programming and measuring analog levels of analog cells or floating gate devices of the network. These networks include EPROM (Electrically Programmable Read Only Memories) and EEPROM (Electrically Eraseable and Programmable Read Only Memories) devices that may use analog levels to increase storage density. In a neural network, training is accomplished by adjusting the weights for connections or synapses between neurons. Initially, all numeric weights for connections between neurons, as well as any weighting of input signals, are randomly set to various values. Signals are then inputted, and the output is observed. If an output signal is erroneous, then a mathematical computation will determine how the weights should be adjusted. Input signals are then re-applied and the output is again re-evaluated, until the output is correct. The technique for back-propagation or feedback of an error correction signal is an important characteristic in training a neural network. One such neural network well known and available in the prior art is the ETANN (Electronically Trainable Analog Neural Network).

Prior art systems exist for programming digital devices. Typically, these programming systems are used for programming EPROMs (Electrically Programmable Read Only Memories). These systems comprise a host computer to which a personal computer personal programmer (PCPP) is coupled. The PCPP is typically a circuit board that plugs into a slot in the host computer. The PCPP provides the host hardware interface to the digital device being programmed. The host computer of these prior art systems is connected to a generic universal programmer interface (GUPI) base via the PCPP. A ribbon cable is typically used to connect the PCPP to the GUPI base. A digital adaptor is then plugged into a socket on the GUPI base. The digital device being programmed is plugged into a socket on the digital adapter.

The PCPP environment with digital adapters in the prior art proved too restrictive for use in training analog devices, since it was defined with purely digital devices in mind. Since the ETANN is mostly analog, adjusting the weight of a synapse in an ETANN is not as straight forward as programming a cell in an EPROM. First, the present weight of the synapse must be read. Second, the delta from the desired weight must be calculated. Lastly, this delta value is converted to an analog programming pulse width and height. The pulse is then applied to the synapse. For these math intensive operations, the digital form of PCPP is unable to support an analog application.

Thus, a better means for training analog synapses in a neural network is needed.

Other prior art known to Applicant is "An Associative Memory Based On An Electronic Neural Network Architecture" by R. Howard et al., *IEEE Transactions On Electronic Devices* Vol. ED34 July 1987; "An Artificial Neural Network Integrated Circuit Based On MNOS/CCD Principles" by J. Sage, *Neural Network For Computing*, AIP Conference Proceedings, 1986; "A 20 V Four-Quadrant CMOS Analog Multiplier", by J. Babanezhad, *IEEE Journal of Solid-Date Circuits*, Vol. SC-20, December 1985; "Programmable Analog Synapses For Microelectronic Neural Networks Using a Hybrid Digital-Analog Approach", by F. J. Mack et al., *IEEE International Conference on Neural Networks*, Jul. 24-27, 1988, San Diego, Calif.; "VLSI for Artificial Intelligence", edited by Jose G. DelGado-Frias and Will R. Moore, Kluwer Academic Publishers, pp. 230-33, 1989; "A Pipelined Associative Memory Implemented in VLSI", by Clark et al., *IEEE Journal of Solid-State Circuits*, Vol. 24, No. 1, pp. 28-34, February 1989; and "A Neuromorphic VLSI Learning System", by Alspector and Allen, Advanced Research in VLSI, Proceedings of the 1987 Stanford conference;

80170XA Data sheet January 1990, Intel Corporation Document Number ETANN-003;

80170NW data sheet May 1990, Intel Corporation Document number 293xxx-001;

GUPI BASE EPS/IPS C. Brabenac, B. Brooks, Dec. 17, 1985, Intel Corporation Document Number 166104;

PCPP/PCPPH EPS/IPS Eng rev. 2 R. Weeden, Dec. 14, 1986, Intel Corporation Document Number 168373.

SUMMARY OF THE INVENTION

The present invention provides a means and method for training an electronic network of analog cells. A generic universal programmer interface (GUPI) is provided to enable connection of an adaptor to a host computer via a personal computer personal programmer (PCPP) for training an ETANN chip. An opening in the top of the GUPI provides for easy plug-in installation of the adaptor.

The adaptor of the present invention plugs into the GUPI module to provide for connecting either an ETANN chip or a Confidence Test Module (CTM) for access by the user via the host computer. A target socket located on the top surface of the adaptor allows the user to physically connect the ETANN chip or the CTM to adapter of the present invention. The target socket is a 208-pin, zero-insertion-force socket that allows a 208-pin device to be installed and removed without physical stress. Approximately 80 percent of the adaptor is analog (digital-to-analog converters, analog-to-digital converters, multiplexers, signal conditioners, etc.); the remaining 20 percent is digital (control logic, status logic, host-to-adaptor data exchange and resource addressing).

Each of the 64 ETANN chip neuron inputs is supplied by a separate 12-bit digital-to-analog converter (DAC) on the adapter with a full-scale range of 0 to +3.5 V. Each DAC includes a register to store the input value. This configuration allows the user to load a new digital value into each DAC separately, and then update all of the analog output values at the same time.

As with the neuron inputs, each parameter is driven by a separate 12-bit input DAC. Each DAC also includes a data register that can be loaded individually. The DAC analog outputs are updated at the same time as the input DACs.

An analog-to-digital converter (ADC) converts the adaptor analog signals to digital signals with 12-bit resolution. The reference to the ADC is set to the appropriate value for the channel being read. A 16-channel multiplexer allows the various ETANN chip output parameters and adaptor test signals to share the ADC with the neuron inputs. As with the neuron outputs, these signals remain stable until all necessary parameters have been acquired.

The 64-channel multiplexer routes each of the 64 neuron outputs to the single high-precision ADC. Although this arrangement allows only one output to be viewed at a time, the outputs of the ETANN chip remain stable so that all outputs can be viewed.

The voltage threshold measurement circuits measure the floating gate charge, or voltage threshold ($V_T$), on the individual cells that store synapse weight and bias values. Twelve bits of resolution are provided. The adaptor uses a binary search instead of a linear ramp to find the threshold value. The target current can be defined with software using the parameter DAC for $V_T$.

The +10-V Kelvin sensing voltage reference is used to set the internal and external voltages. The reference voltage is divided and distributed to the circuits that require a reference. These include the input digital-to-analog converters (DACs), the parameter DACs, the analog-to-digital converter (ADC), and the voltage threshold ($V_T$) measurement circuits.

A synapse current has three components: positive, negative, and differential. The synapse current measurement circuits allow the components of the synapse currents to be measured. A current source provides the current required to place a specific voltage drop across each half of the synapse. This current is then measured and both the components and the differentiated version are applied to the ADC.

A neuron summing node voltage has three components: positive, negative, and differential. The neuron summing node circuits measure the components of a selected neuron summing node and apply the results directly to the ADC.

The perturbation circuits perturb (modify) the characteristics of a neuron summing node by sinking some of the available current, and are controlled by two of the parameter DACs. Because the ETANN chip uses differential channels internally, both positive and negative components must be perturbed. The software of the present invention calculates each component and applies those as required.

The part position tester circuit examines the ground grid of the ETANN chip or CTM to determine the current physical orientation using a low-power ohmmeter. If the device ground grid is improper, the device is reported to be installed 90, 180, or 270 degrees out of correct orientation. Once correct orientation has been established, the circuit determines if an ETANN device is installed. If the device installed in the socket is an ETANN chip, that report is generated. If an ETANN chip is not installed, a search for a path unique to the CTM is performed. If the CTM path is found, the presence of a CTM is reported. If it not found, the socket is reported to be empty.

The adapter provides means for program storage local to the adapter using program storage circuitry. This allows each adapter to have its own unique code.

Isolation circuits electrically separate the adaptor target socket from the drive circuits so that the user can install and remove the ETANN chip or CTM without damaging either the adaptor, the ETANN chip or CTM. The isolation circuits include electronic switches for all signals except the $V_{PP1}$, $V_{PP2}$, and Target $V_{CC}$ lines.

An ETANN chip power supply located on the adapter provides the current required by one ETANN chip, and uses a switching circuit to reduce overall power dissipation. Target $V_{CC}$ is regulated locally under software control.

A single user programmable gate array (PGA) located on the adapter is used for storing the logic requirements of the adapter. This logic is initially configured from configuration data stored in an 8 pin, bit serial PROM which is read by the PGA.

The confidence test module (CTM) is a plug-in device that is inserted into the adaptor target socket and is used to verify adapter functionality each time power is applied to the system (before an ETANN chip is installed in the target socket). Because it ensures that the adapter is completely functional before chip installation, it prevents possible damage to the ETANN chip.

The CTM consists of three device orientation detection check circuits, two 16-channel analog multiplexers, one 2-channel 4-input analog multiplexer, a loopback circuit, and a state sequencer.

The orientation detection check circuits produce three signals. These signals simulate that an ETANN chip is installed clockwise from the proper position by 90, 180, or 270 degrees.

The 16-channel and 2-channel multiplexers sequence the simulated ETANN chip signals to the target socket neuron output line for measurement by the present invention.

The loopback circuit provides for connecting, under diagnostic software control, inputs I0 through I63 to outputs N0 through N63 for measurement. All of these lines except N32 and N33 are directly supplied by inputs. The signals applied to outputs N32 and N33 are switchable, under software control and can be either inputs I32 and I33, respectively, or DAC calibration voltages 4.9979 V and 610 uV, respectively.

The state sequencer is a state machine with 50 states, with each state used to control connection of one simulated ETANN chip signal to the target socket neuron output line. States 0 through 33 control connection of 32 individual lines to the neuron output line for verification. States 34 through 41 measure and decide the voltage on the target socket SMOP pin to derive the synapse current into the SMOP pin. States 42 through 45 measure and divide the voltage on the SMOP pin to derive the synapse current into the target socket SMON pin. States 46 through 48 test the ETANN chip orientation circuits.

The present invention also includes control software in the form of a host executive program. The host executive program of the present invention is an executable software module running in the host computer that allows a user to interface with and manipulate or simulate the ETANN chip. The host executive software provides modules for performing various functions in the ETANN training process. Diagnostic software is also provided for verifying the proper operation of the training system.

One object of the present invention is to provide a means and method for precisely training a neural network. Another objective of the present invention is to provide a means and method for measuring and setting analog weights in synapses of a neural network. Another objective of the present invention is to provide a means and method for verifying the proper operation of the training system.

These and other objects and aspects of the present invention will be apparent to one with ordinary skill in the art from the detailed description of the invention provided herein.

DETAILED DESCRIPTION OF THE PREFERRED EMBODIMENT

A means and a method for training an electronic network of analog cells is described. In networks like a neural network, training the network includes programming and measuring analog levels of analog cells or floating gate devices of the network. These networks include EPROM (Electrically Programmable Read Only Memories) and EEPROM (Electrically Eraseable and Programmable Read Only Memories) devices that may use analog levels to increase storage density. In a neural network, training includes adjusting the weights and biases for connections or synapses between neurons.

In the following description, numerous specific details are set forth in order to provide a thorough understanding of the present invention. However, it will be apparent to one with ordinary skill in the art that these specific details need not be used to practice the present inventin. In other instances, well-known structures and circuits have not been shown in detail in order not to unnecessarily obscure the present invention.

Figure 2A:
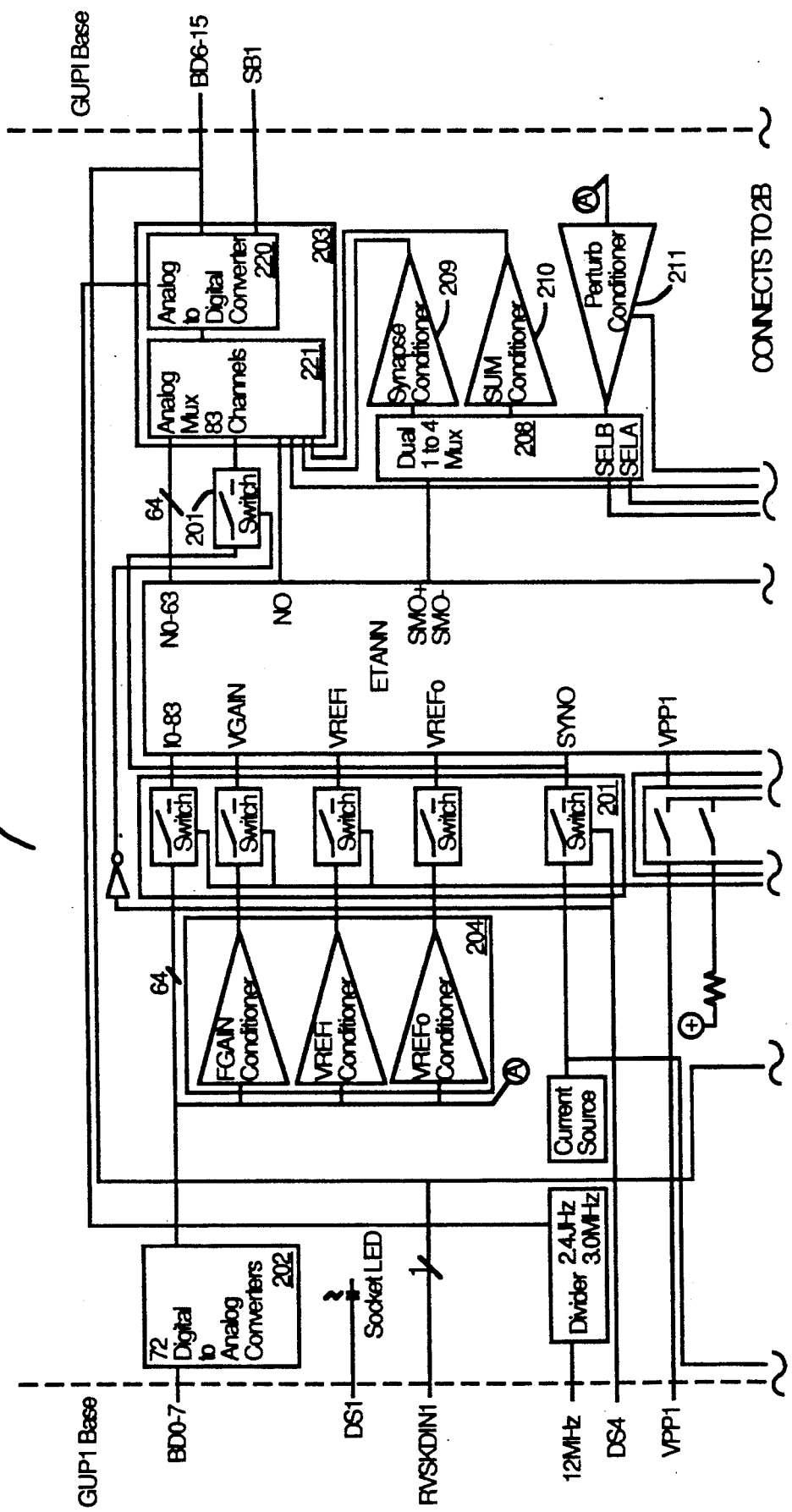
FIGS. 2A, 2B, and 2C are a detailed block diagram of the adapter hardware of the present invention.
Figure 2B:
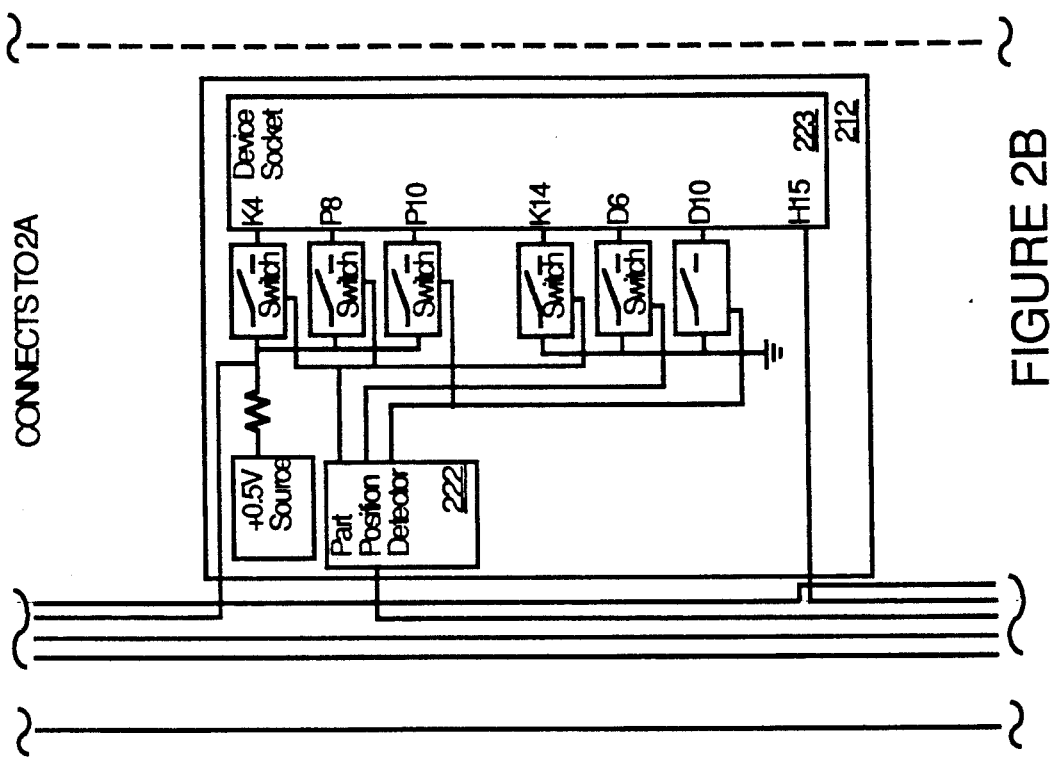
Figure 2B:
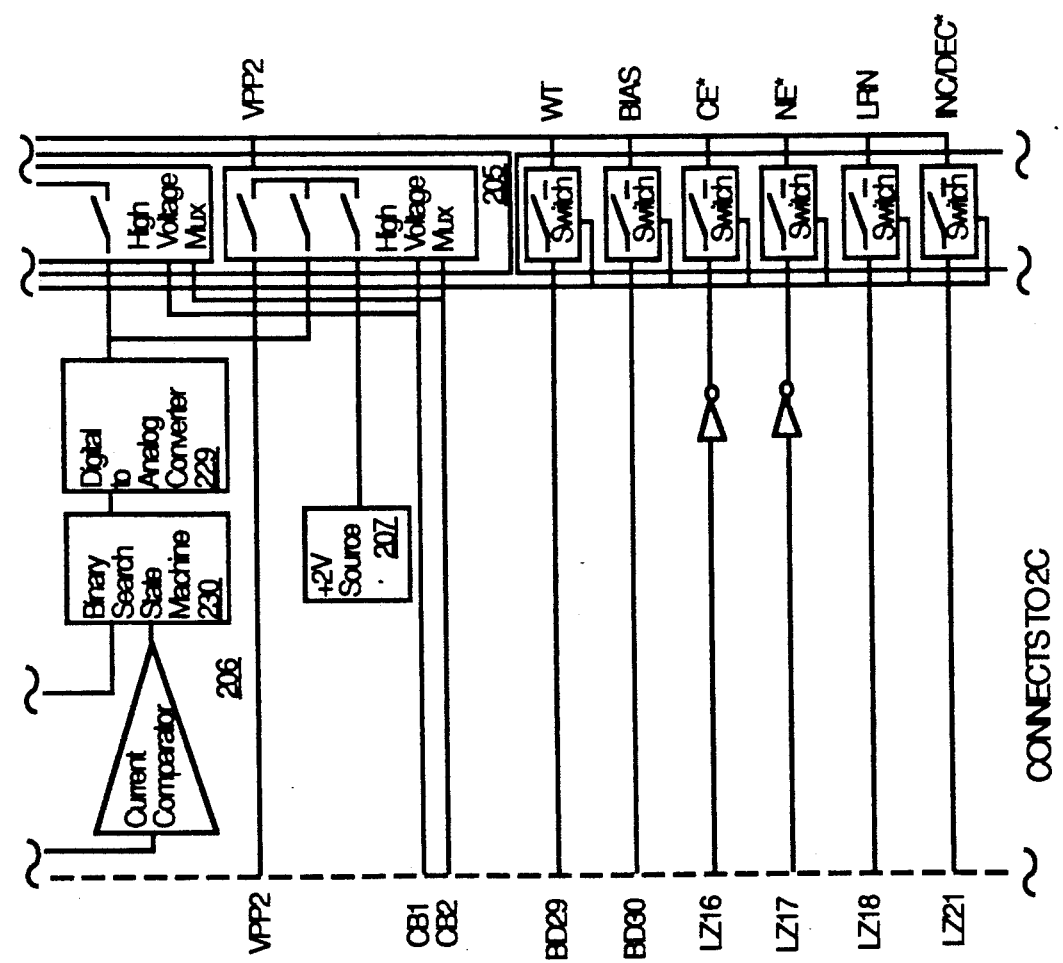

In the preferred embodiment of the present invention, analog cells or synapse cells of a neural network are implemented using floating gate devices. A synapse cell using a floating gate device is shown in FIGS. 2a and 2b of co-pending patent application "Semiconductor Cell for Neural Network and the Like", Ser. No. 225,035, filed Jul. 27, 1988 and assigned to the assignee of the present invention. Generally, a synapse cell has a floating gate member which is electrically chargeable. The presence or absence of charge on the floating gate member affects the conductivity of the floating gate device. The analog charge can be accumulated or removed from the floating gate device by applying a voltage pulse to the device. A method for adaptively setting analog weights in a neural network and the like is disclosed in co-pending patent application "Adaptively Setting Analog Weights in a Neural Network and the Like" filed concurrently with the present application and assigned to the assignee of the present invention. In this manner, the analog cells of a neural network can be trained.

Neurons and synapse cells are grouped and interconnected to produce a neural network. Techniques for creating a neural network in this manner are well known in the art. One such prior art neural network is the i80170 ™ or ETANN (Electronically Trainable Analog Neural Network). The ETANN is a neural network implemented on a single semiconductor chip. The ETANN was developed by the assignee of the present invention.

The adaptor of the present invention provides the means of manipulating the ETANN for the purpose of training (establishing the values of the weights and biases) the neural network. Once trained, the ETANN chip "remembers" what it has been taught, thus providing a platform for any application requiring fast pattern recognition capabilities (such as speech and image processing). The adaptor allows the use of a single ETANN and provides software with the means of manipulating the ETANN's control lines, setting stimulus voltages, measuring response voltages, measuring internal settings, and writing new internal settings. Since the ETANN has several configuration options, no attempt has been made to choose one option over another. Maximum flexibility has been provided which leaves all configuration choices to the user of the present invention.

The present invention supports simulation of ETANN chip behavior, downloading of simulation data to the ETANN chip, verification of application behavior, and convergence training. Additionally the present invention provides diagnostics and the ability to access and alter ETANN chip resources.

Figure 1:
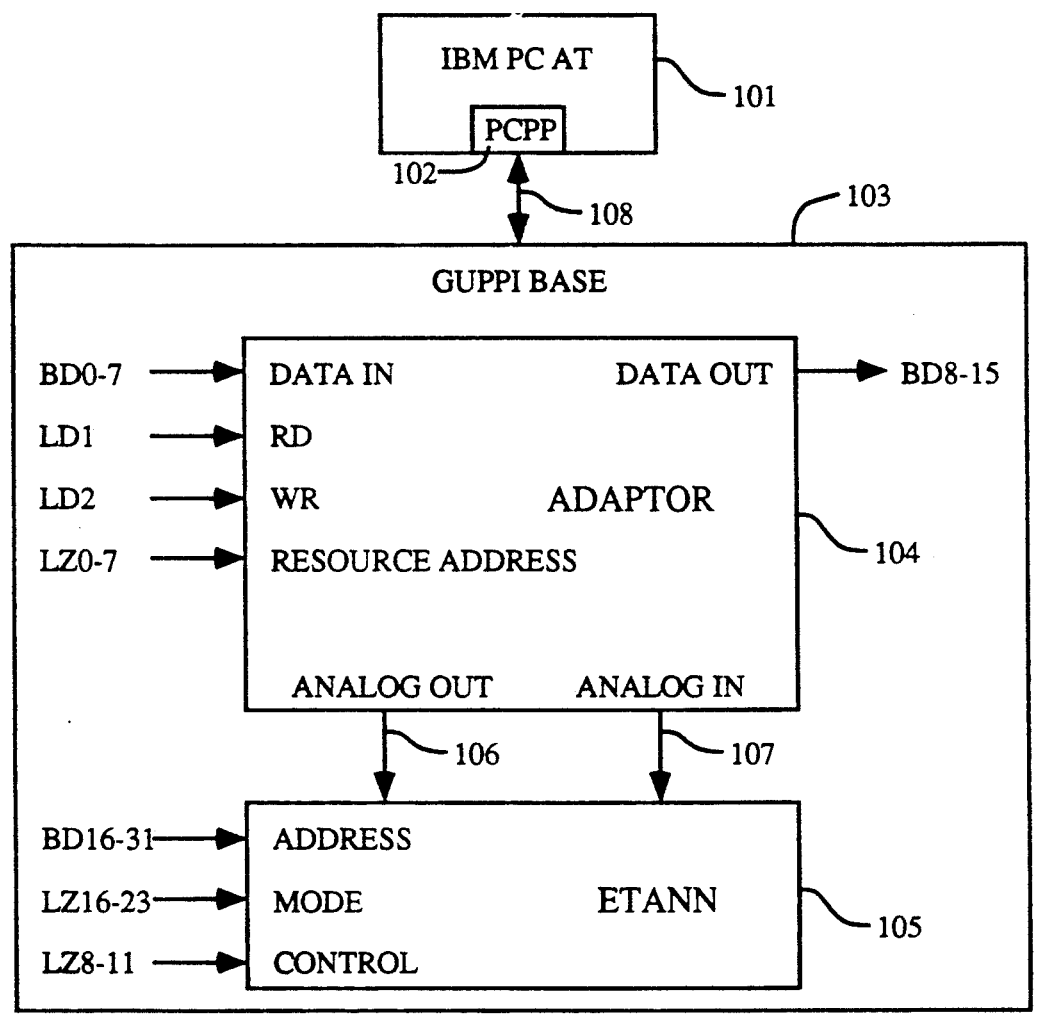
FIG. 1 is an illustration of the neural network training system of the present invention.

Referring to FIG. 1, the neural network training system of the preferred embodiment is illustrated. A computer 101 serves as the host for a personal computer personal programmer (PCPP)102. The PCPP 102 is typically a circuit board that plugs into a slot in the host computer 101. The PCPP provides the host hardware interface to the adapter 104 and the ETANN being trained 105. The host computer 101 is connected to a generic universal programmer interface (GUPI) base 103 via the PCPP 102. A ribbon cable 108 is used to connect the PCPP 102 to the GUPI 103. An adaptor 104 is plugged into a socket on the GUPI base 103. The ETANN chip being trained 105 is plugged into a socket on adapter 104. Programming voltages are generated on the PCPP, regulated and shaped on the GUPI and switched on the adaptor 104. Timing is accomplished through software timing loops on the PCPP.

In the preferred embodiment, an IBM PC/AT ™ or 386 ™ processor is used as the host computer 101. The design and operation of a host computer 101, PCPP 102, and GUPI 103 as used for programming digital devices, such as electrically programmable read only memories (EPROMs) is well known in the art. The application of these components to the training of an analog device such as the ETANN is not well known. In order to apply the host computer 101, PCPP 102, and GUPI 103 toward the ETANN training application, the present invention includes adapter 104 and the system software necessary to control the operation of the adapter 104 and the ETANN chip mounted therein.

The PCPP/GUPI base provides power, programming voltages and latched signals for the purpose of interfacing with the adaptor 104. In the preferred embodiment, power includes +27 V unregulated, +12 V regulated, −12 V regulated and +5 V regulated supplies. The programming voltages provided from the GUPI base are selected when needed and then buffered to the ETANN socket. The latched signals are sequenced by the PCPP and used to directly manipulate the ETANN, and the adaptor. Some of these signals are used for return data from the adaptor 104.

The adaptor 104 provides the resources needed for training in several modes. These training modes include: digital to analog conversion for driving the ETANN's analog input pins; a single analog to digital converter with an 80 channel analog multiplexer for measuring the ETANN's analog outputs; neuron perturbation circuitry; synapse current measurement circuitry; neuron sum measurement circuitry; $V_{PP}$ management circuitry; a binary searching synapse weight measurement circuit; isolation switches and the logic necessary to connect all these resources to the ETANN and the GUPI base.

The proper operation of the adaptor 104 is insured by use of diagnostic software working in conjunction with a Confidence Test Module (CTM). The CTM is a device which plugs into the adapter socket that normally receives the ETANN. The CTM provides loop through paths, high voltage division, precision voltage references and a 'cell simulator', all under the control of the diagnostic software. The diagnostics software is then able to test the entire adaptor for proper functionality and accuracy with the single exception of socket isolation.

Referring again to FIG. 1, the primary hardware interfaces between the GUPI 103, the adapter 104 and the ETANN 105 are shown. Adaptor data input is provided by GUPI signals BD0-7. Adaptor data output is provided by GUPI signals BD8-15. Adaptor read and write commands are provided by GUPI signals LD1 and LD2. Adaptor resource addresses are provided by GUPI signals LZ0-7.

The ETANN address is provided by GUPI signals BD16-31 (WT, BIAS and INC/DEC* signals are grouped with the 13 address lines). The ETANN mode data is provided by GUPI signal LZ16-23. The ETANN control is provided through GUPI signals LZ8-11.

Figure 2C:
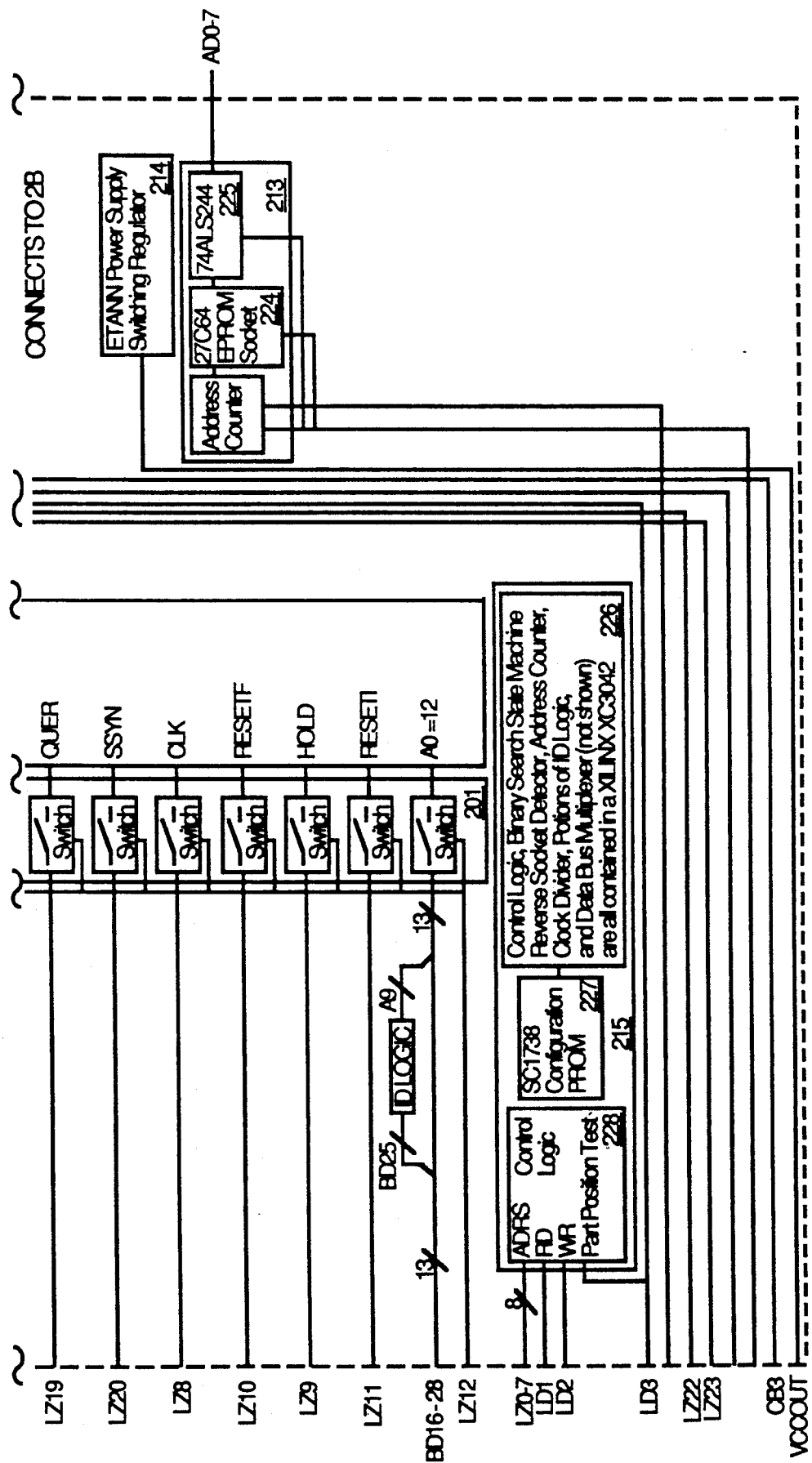

Referring now to FIGS. 2A, 2B and 2C, a detailed diagram of adapter 104 is illustrated. As shown in FIGS. 2A, 2B and 2C, secondary adaptor hardware interfaces in addition to those shown in FIG. 1 are present. Adaptor controls such as isolation, $V_{PP}$ source selection, SMO usage selection, LED operation, perturb current range and reverse socket detection are controlled with LZ12, CB1 and 2 and DS4, LZ22 and 23, DSI CBN3 and LD3.

The ETANN address (BD16-31), mode (LZ16-23) and control (LZ8-11) signals are all digital and can be isolated from the ETANN socket by tri-stating the buffers that drive them. All the remaining signals are analog. With the exception of the $V_{PP}$ lines shown in FIGS. 2A and 2B, the remaining signals can be isolated by opening the CMOS bilateral switches 201 in series with each signal. All of the isolation devices are controlled with a single signal 'EN$_{13}$DRIVE' which is found on line LZ12 shown in FIG. 2C. This line also forces the target power supply into the isolation mode.

Referring again to FIGS. 2A, 2B and 2C, the function and operation of each of the basic functional components of the adapter 104 is described in detail in the sections that follow.

DIGITAL TO ANALOG CONVERTERS

The adaptor itself uses twelve bit digital to analog convertors (DACs) 202 to generate the analog stimulus for the ETANN. Sixty-four ETANN input lines, one gain line and two reference lines are each driven by their own DAC within DACs 202. These signals are isolated from the ETANN socket as described above. The sixty-four neuron outputs, summing node outputs, synapse current monitors, and the selected neuron output are all multiplexed together and fed to a single twelve bit analog to digital converter. ETANN socket isolation is also provided for these signals.

In the preferred embodiment, there are 72 digital to analog converters in all with no spares. Dual twelve bit converters with +½ LSB relative accuracy and +5 LSB full scale error are used. The 64 DACs which drive the ETANN inputs share a common reference which is provided by DACREFIN. This voltage is nominally at +3.500 V allowing the full resolution of the DAC to be applied over a fixed range making each step worth 854 uv. This is done so the input can be driven to values outside the usable input range of the ETANN as might be done in real applications. The remaining 8 DACs share a precision +5 V reference, making each step worth = 1.2 mV. These DACs are in use for driving the following ETANN signals: VGAIN; VREF1; VREF0/ADCREF; POSITIVE PERTABATION; NEGATIVE PERTABATION; SYNAPSE CURRENT OFFSET; SUM OUT OFFSET AND $V_t$-THRESHOLD. All but three of these DACs, (VGAIN, VREF1, VREF0) drive their loads directly.

Data is loaded into the DACs on a low byte/high nibble basis into intermediate storage registers. After one or multiple DACs have had new data loaded into their intermediate registers, the DACs are 'updated' with a common strobe to their new values. DACs which did not receive new data simply 'update' to the value in their intermediate registers which has not changed. Data is expected to be settled to ½ LSB within 5 us of the trailing edge of the update strobe. Separate adaptor resource addresses are used for each LSB and MSN which together uses 144 of the 256 available addresses.

The accuracy is expected to be +4.9 mV (+3.3 mV for stimulus DACs) or +4 LSB over the nominal operating temperature range.

The formulas for calculating absolute voltage for a given DAC setting or ADC reading are as follows:
BSSM DAC used for weight measurement uses the formula:

$$\text{VOLTAGE} = 4 * \left( \frac{\text{VALUE}}{4095} \right)$$

DACs used for VGAIN (0×40), Vt_ THRESHOLD (0×43), PERT positive (0×44), PERT negative (0×45), SYNAPSE CURRENT OFFSET (0×46), and SUM OUTPUT OFFSET (0×47) use the formula:

$$\text{VOLTAGE} = 5 * \left(\frac{\text{VALUE}}{4095}\right) \text{or,}$$

$$\text{VALUE} = 4095 * \left(\frac{\text{VOLTAGE}}{5}\right)$$

The DAC used for VREFi (0×41) uses the following formula:

$$\text{VREFi VOLTAGE} = 1.719 * \left(\frac{\text{VALUE}}{4095}\right) \text{or,}$$

$$\text{VALUE} = 4095 * \left(\frac{\text{VREFi VOLTAGE}}{1.719}\right)$$

The DAC used for VREFo (0×42) uses the following formula:

$$\text{VREFo VOLTAGE} = 1.372 + 1.13 * \left(\frac{\text{VALUE}}{4095}\right) \text{or,}$$

$$\text{VALUE} = 4095 \left(\frac{\text{VREFo VOLTAGE} - 1.372}{1.13}\right)$$

The voltage produced by the DACs used for the 64 I[x] pins are calculated as follows:

$$\text{VOLTAGE} = \text{VREFi} * \left(\frac{\text{VALUE}}{4095}\right) \text{or,}$$

$$\text{VALUE} = 4095 * \left(\frac{\text{VOLTAGE}}{\text{VREFi}}\right)$$

If VREFi is not known, but the VALUE loaded into VREFi is, then use:

$$\text{VOLTAGE} =$$

$$1.719 * \left(\frac{\text{VREFi\_VALUE}}{4095}\right) * \left(\frac{I(x)\_\text{VALUE}}{4095}\right)$$

or, $$I(x)\_\text{VALUE} = 4095 * \left(\frac{\text{VOLTAGE}}{1.719 * \left(\frac{\text{VREFi\_VALUE}}{4095}\right)}\right)$$

ADC channels used for SUM_OUT positive (0×40), SUM_OUT negative (0×041), SYNAPSE_CURRENT positive (0×42), SYNAPSE_CURRENT negative (0×43), NEURON OUTPUT (0×44), SYNAPSE OUTPUT (0×45), Differentiated SUM OUT (0×46), Differentiated Synapse Current (0×47), and spares (0×48 to 0×4f and 0×60 to 0×7f) use the formula:

$$\text{VOLTAGE} = 5 * \left(\frac{\text{VALUE}}{4095}\right) \text{or,}$$

$$\text{VALUE} = 4095 * \left(\frac{\text{VOLTAGE}}{5}\right)$$

The voltage produced by the ADC channels used for the 64 N[x] pins are calculated as follows:

$$\text{VOLTAGE} = \text{VREFo} * \left(\frac{\text{VALUE}}{4095}\right) \text{or,}$$

$$\text{VALUE} = 4095 * \left(\frac{\text{VOLTAGE}}{\text{VREFo}}\right)$$

If VREFo is not known, but the VALUE loaded into VREFo is, then use:

$$\text{VOLTAGE} = \left\{1.372 + 1.13 * \left(\frac{\text{VREFo\_VALUE}}{4095}\right)\right\} * \left(\frac{I(x)\_\text{VALUE}}{4095}\right)$$

or, $$I(x)\_\text{VALUE} =$$

$$4095 * \left(\frac{\text{VOLTAGE}}{\left\{1.372 + 1.13 * \left(\frac{\text{VREFo\_VALUE}}{4095}\right)\right\}}\right)$$

The OHM METER channels of the ADC are used by the part position tester and measure a 0.5 V source via a 30.1K resistor. The resultant voltage is scaled up by a factor of 9.25. The Reference is +5 V and results in a maximum reading of 3809 for open leads. The value for shorted leads will be determined by the resistance of the switch which selects where the leads will be connected. Since the on resistance is typically 280Ω for each leg, the voltage measured will be 9.1 mV and when scaled up will result in a reading of 69. The formula is as follows:

$$\text{MEASURED VOLTAGE} = 0.541 * \left(\frac{\text{VALUE}}{4095}\right)$$

$$\text{UNKNOWN OHMS} = \left(\frac{0.5 - \left(0.541 * \left(\frac{\text{VALUE}}{4095}\right)\right)}{30100}\right) *$$

$$\left(0.541 * \left(\frac{\text{VALUE}}{4095}\right)\right) - 560$$

ANALOG TO DIGITAL CONVERTER AND MULTIPLEXER

The analog acquisition circuitry 203 consists of a single twelve bit analog to digital converter (ADC) 220 with + or − ½ LSB non-linearity and + or − 4LSB untrimmed unipolar gain error and a single 8 channel analog multiplexer in series with five 16 channel analog multiplexers 221. The reference is switched, depending upon the entity being measured, between −5 V and a derivation of VREF0. When measuring one of the neuron outputs, the reference is equal to 2 *VREF0 so the entire resolution of the ADC 220 can be applied to the usable output range of the ETANN. Since VREF0 is supplied by a DAC 202 under software control, the absolute voltage measured on any neuron output can be calculated. The remaining signals are measured using a precision −5 V reference which offers a 0 V to 5 V measurement range in ≈1.2 mV steps. Since the ADC 220 has an input current load of 3.5 mA, a precision opamp configured as a follower buffers the input. This follower has adjustments for correcting offset and full scale gain errors to + or − 1LSB. The high input impedance of the follower has the effect of rendering the resistance of two CMOS switches 201 on each channel negligible. No sample and hold is necessary, since all signals are expected to be stable during the measurement cycle of 5us.

The channel selection is controlled with seven of the adaptor resource address lines LZ0-7. The four lowest bits select one of sixteen channels on each of the five sixteen channel multiplexers. The resultant multiplexed signals are then sent to five inputs of the eight locations. The eight channel multiplexer uses the next three most significant bits to place the signals selected by the sixteen channel multiplexers at adjacent addresses.

The first, second, third and fourth sixteen channel groups are concatanated to create 64 consecutive locations which are used for the 64 neuron outputs. When these channels are read, the reference equals 2 * VREF0.

The fifth set of sixteen locations are divided into two(2) groups: The Normal operation group and the Test/Cal group. The Normal operation group uses the first eight (8) addresses and are arranged as follows: Positive SUMOUT component; Negative SYNapse CURrent component; Selected Neuron Output; SYNO; Differentiated SUMOUT and Differentiated SYNapse CURrent. The Test/Cal group uses the next seven (7) addresses which are arranged as follow: CALBRATION LOW; CALIBRATION HIGH/TST5V_VREF; 2V_ SOURCE; 500 mV_SOURCE; DACREFIN and TST_NEG4V. This leaves one spare which is tied to analog ground via a 0 Ω resistor jumper and will produce ground level if read.

The sixth sixteen channel group is not completely visible, since some of the addresses are used for other registers. The first three of these addresses serve as a volt meter used for part position testing. The next address accesses the ADC for the purpose of verifying the ohm meter source in an 'open lead' condition. The value read represents 500 mV across the 'leads' and is scaled to 4.65 V absolute. The last two addresses serve as local registers and cannot access the ADC. All remaining addresses in this group are not used and will read the value for 'open leads' or +4.65 V.

The last two sixteen channel groups are not used at all. The 8 channel multiplexer inputs for these blocks are tied to ground via 0Ω resistor jumpers. Reading these channels will produce ground level readings.

Since the data path is eight bits wide, and the ADC does not provide services for reading eight bits at a time, four bits are latched and padded with zeros for later reading of the MSB. The LSB is read directly onto the data bus.

To measure a signal, the software uses the following steps:
1. Place the desired address on the adaptor resource address bus (LZ0-7).
2. Raise RD (LD1)
3. Poll the GUPI status register SB bit until it shows a done status (high).
4. Read the LSB from the adaptor data port (BD8-15).
5. Lower RD (LD1) to latch the MSB for later reading.
6. Raise bit 7 of the address and place on the adaptor resource address bus.
7. Raise RD (LD1).
8. Read the MSB from the adaptor data port (BD8-15).
9. Lower RD (LD1).

After trimming, the accuracy becomes + or −1.8 mV or + or −1.5 LSB over the operating temperature range.

VGAIN, VREF1 and VREF0 SIGNAL CONDITIONERS

The VGAIN, VREF1 and VREF0 signals 204 require scaling and buffering before use. This allows the full resolution of the DACs 202 controlling these signals to be used. For all three signals, the respective DAC uses a +5 V reference and will produce 1.22 mV per step for a full scale value of +4.998 V. The VREF0 signals has a scaler attached for deriving the ADC reference used by the neuron measurement channels of the ADC. This reference scaler will be described here as well.

VGAIN requires 0 V to +5 V for the purpose of adjusting sigmoidal gain. In this instance, a simple non-inverting follower provides buffering. This signal is isolated from the ETANN socket through a CMOS bilateral switch 201.

VREF1 is used by the ETANN to set input sensitivity if using analog stimulus or thresholds if using digital stimulus. The adaptor 104 can drive the inputs from 0 to +3.5 V even though the maximum useful input is defined as VREF1 * 2. The maximum allowable input voltage that will not saturate the ETANN network is +3.4 V. This means that VREF1 is allowed to range between 0 V and +1.7 V. A scaler with a gain of 0.340 provides the necessary results in a resolution of 415 μV per step. This signal is isolated from the ETANN socket through a CMOS bilateral switch 201.

VREF0 is used by the ETANN to set the output amplitude. This signal is restricted to the +1.4 V to +2.5 V range with the maximum output being VREF0 * 2. A 'Y' resistor network is used to sum the +5 V reference, the DAC output and GROUND. An opamp configured as a follower buffers this signal. The actual swing achieved in the circuit is +1.372 V to +2.502 V. The resulting delta voltage is 1.130 V or 275 μV per step. This signal is isolated from the ETANN socket through a CMOS bilateral switch 201.

The reference for the ADC when measuring the output signals is derived from VREF0. The ADC requires a reference that is equal to-(desired full scale range). Since VREF0 is ½ the maximum output signal value, a simple inverter with a gain of 2 is provided. The resultant signal is ADCREFN which is used only when measuring neuron output signals.

PROGRAMMING VOLTAGE MULTIPLEXERS

The programming voltage pins VPP1 and VPP2 are used for several functions and will seee voltages as high as +19 V. During normal operations, if the ETANN is powered up, both these pins are tied to the ETANN power source which is nominally +5 V. During weight measurement, VPP1 receives a voltage between 0 V and 4 V for the purpose of measuring the threshold of a weight. At the same time, VPP2 is set to 2 V and serves as a reference. During programming cycles, the GUPI provides programming voltages and waveforms designed to record a specific value into the currently addressed floating gate cell. These pins can sink or source up to 1 mA.

In order to provide a low impedance during programming and to minimize the voltage drop across the switch, a CMOS bilateral switch was not used to handle the VPP signals directly. Rather, a dual CMOS analog multiplexer 205 was used to route the desired signals to a voltage follower sourced from +24 V and −4.3 V supplies. The high input impedance of the follower makes the 'on' resistance of the multiplexer insignificant. A resistor in series with the output of the follower, but within the feedback loop, provides some isolation and current limiting when the socket is 'isolated'.

In order for the multiplexer 205 to handle voltages higher than +15 V, it is sourced from +26 V and −4.3 V supplies. This requires the control signals (multiplexer address) to traverse non-TTL levels. A shunt regulator places the actual thresholds at below +12.5 V for a 0 and above +14.2 V for a 1. The GUPI signals CB1 and CB2 are high voltage (+30 V) open collector type and with pull-ups to an ETANN-Vcc qualified +24 V will have the required amplitude.

The signal known as CB1 on the GUPI is known as VPPSELA on the adaptor, and CB2 is known as VPPSELB. When VPPSELA (CB1) and VPPSELB (CB2) are both low, a Voltage equal to that on the Vcc pins of the ETANN is applied to the VPP pins. This places the VPP pins in their normal state. A comparator monitors the Vcc potential for the ETANN. If the Vcc potential falls below 1.75 V and stays below 2 V, VPP and weight measurement voltages will be disallowed by disabling the +24 V pull-up supply. Otherwise, if Vcc rises above 2.0 V and stays above 1.75 V, VPP programming voltages can be selected by raising VPPSELA and leaving VPPSELB low, or, weight measurement voltages can be applied by raising VPPSELB and leaving VPPSELA low. Raising both VPPSELA and VPPSELB is illegal and produces the same results as leaving both VPPSELA and VPPSELB low.

The voltage followers that drive the VPP pins are never isolated from the socket, but instead are held to GROUND potential through a 200Ω resistor. Current limiting to 40 mA is provided in the event voltage is applied while the pin is shorted to ground or for an internal ETANN fault. NO protection is provided for the application of external voltages.

WEIGHT MEASUREMENT CIRCUITRY

A synapse in the ETANN is configured by using two EPROM like cells, one of which holds a 'weight' while the other holds a 'reference'. A weight or reference is stored in the form of an electrical charge on the gate of a floating gate device. Since the floating gate can't be measured directly, a path for determining the charge is provided by the ETANN. By using a control gate on the floating gate device, a voltage can be found that will set a particular drain current. This voltage is referred to as the Vt or voltage threshold of the cell. The Vt of a weight or reference cell can be measured by:

1. Selecting the cell.
2. Applying a reference voltage to VPP2 which serves as the source of the device.
3. Applying a current to SYNO which serves as the drain of the device.
4. Varying the voltage applied to VPP1, which is the control gate, until the current through SYNO equals a particular value known as the Vt threshold.

When the threshold is met, the charge on the floating gate can be calculated based on the gate voltage (VPP1) minus the reference applied to the source (VPP2).

Weight measurement circuitry 206 is provided in adapter 104 for measuring the weight of a particular cell in the ETANN. The voltage source for VPP1 is provided by a precision 12 bit DAC 229. With 4096 steps available, and 10.6 us required to test each step, an exhaustive search or ramping until a match is found would not be practical. The adapter provides a state machine 230 in hardware that performs a binary search on the selected weight. All twelve bits must be tested since the current measurement device is a simple comparator that reports high/low. This results in a measurement that takes 130 us. Going any faster would exceed the ½ LSB error bandwidth of the ETANN, the DAC 229 and comparator combined.

The state machine 230 sequence is as follows:
1. Clear all data bits and the done flag to 0.
2. Set a mask for the bit to be tested to the MSB.
3. Set a counter to 12, one count for each bit.
4. Set the bit specified by the mask.
5. Wait for the analog circuitry to settle.
6. Read the results of the current comparator.
7. If (current high) then {clear the bit specified by the mask}
8. Advance the mask to the next bit down.
9. Decrement the counter.
10. If(count>0) then {go to step 4}
11. Set the done flag.

The sequence the software would use to measure a weight is as follows:
1. Set the ETANN mode and address.
2. Write to the adaptor mode port with bit 0 set. This starts the measurement.
3. Poll the adaptor status register for the 'done' bit (bit 0) to return high.
4. Read the LSB of the weight register.
5. Read the MSB of the weigh register.

The accuracy is expected to be + or −3.9 mV or + or −4LSB over the operating temperature range.

REFERENCE SOURCES

The accuracy of the entire analog signal generation and acquisition system is based on a single high precision +10 V reference. This signal is guaranteed by the manufacturer to be +10.000 V + or −1 mV over the entire operating temperature without any trimming of any sort. With proper layout and attention to noise, this source serves as a stable master reference for the entire adapter.

Since each part of the analog path requires a different reference, the 10 V master reference is provided to a set of resistive voltage dividers. Each divider consists of a 12 turn 5% potentiometer and two fixed 1% resistors.

All three parts are rated at + or −50 ppm/degree C. This results in a voltage level that won't vary by more than + or −250 μV over the operating range. Each of these signals are buffered with a low noise, low offset opamp. The positive references use non-inverting buffers which will offer + or −600 μV drift over the operating temperature range. The negative reference use inverting buffers which offer + or −1.2 mV drift.

The positive references will vary by no more than + or −850 μV (+ or −0.7 LSB) over the operating temperature range for the positive references and no more than + or −1450 μV (+ or −1.2 LSB) over the operating temperature range for the negative references.

Each line is capable of supplying 25 mA, far more than any of the loads require.

The reference voltages and their values are as follows:

1. +5 is used by the DACs that don't drive ETANN I(X) signal inputs.
2. DACREFIN (+3.500 V) is used by the DACs that drive ETANN I(X) signal inputs.
3. +2 V is used as the reference voltage during weight measurement on VPP2. For convenience, this value is also used as a threshold in other parts of the adaptor.
4. −4 V is used for the weight measurement DAC.
5. −5 V is used for by ADC 220 when it isn't measuring the neuron signal outputs.

SYNAPSE CURRENT MEASUREMENT CIRCUITRY

This circuitry handles the synapse current measurements through SMO+ and SMO−. This pair of signals is a direct view into the internal differential nodes of a single synapse. The particular synapse is selected through the ETANN address lines (BD16-31). Each signal represents a component of the synapse function and can be digitized independently or combined differentially prior to digitization. The independent (component) measurement is useful when debugging to identify large offsets and clipping in one half of the function. The differential mode is typically used by the training algorithms.

A dual 1 to 4 multiplexer 208 is used to connect the SMO+ and SMO− to the synapse measurement circuitry 209 by lowering SMO_SELB and raising SMO_SELA. This assumes that EN_DRIVE is active (TTL high).

The current necessary to bring SMO+ and SMO− to the same potential as the ETANN Vcc pins is converted to a voltage and presented to offsetters prior to digitization of the component signals. These currents are also presented to a differentiator as voltages and summed with an offset value, SYN_CUR_OFST. The offset value is typically used to place the differentiated result within measurement range of the ADC 220. Since software controls this offset value, it can be reinstated after digitization. Note that the component measurement is based on ETANN Vcc, and therefor, software must know this value. This will be the poor resolution value that was used in setting the 8 bit ETANN Vcc. Note that this will affect the overall accuracy of component measurement.

The Analog to Digital converter 220 translates these 0 to 5 VDC levels to a digital value. The resolution of this translation is 1.22 mV per step. The component portion of these signals is equal to:

$$\frac{(((5 - \text{voltage read}) + 5) - POW\ 80170)}{249000}$$

for range of 0 to 20.8 μA or 0.005 μA per step.

From the component portions of the Synapse Current signals, SMO+ and SMO− use the formula:

$$\text{CURRENT (in μA)} = \left( \frac{\left(10 - \left(\left(\frac{SYNCURx}{4095}\right) * 5\right)\right) - \left(\left(\frac{ADC\ 0x\ 4F}{4095}\right) * 6.91923077\right)}{249000} \right) * 1e^6$$

For the differentiated signal, the voltage is allowed to range from −5 V to +5 V that can be attributed to the current monitoring which equates to 20.08 μA to −20.08 μA. The OFFSET signal can shift this voltage positively by up to 5 V. The result is a signal that can range from −5 V to +10 V. While this is not detrimental to the ADC, it can make measurement a problem. The appropriate use of the signals is to use OFFSET to slide the current values into the range of the ADC much like using a vertical position control on an osciliscope. The resultant formula is:

$$\Delta \text{CURRENT (in μA)} =$$

$$\left(20.080321 * \left(\frac{DSYNCUR}{4095}\right)\right) -$$

$$\left(20.0754188 * \left(\frac{OFFSET\_VALUE}{4095}\right)\right)$$

SUM OUTPUT CIRCUITRY

This circuitry handles the neuron sum output measurements through SMO+ and SMO−. This pair of signals is a direct view into the internal differential nodes of a single neuron. The particular neuron is selected through the ETANN address lines (BD16-31). Each signal represents a component of the neuron summing function and can be digitized independently or combined differentially prior to digitization. The independent (component) measurement is useful when debugging to identify large offsets and clipping in one half of the function. The differential mode is typically used by the training algorithms.

A dual 1 to 4 muliplexer 208 is used to connect the SMO+ and SMO− to the neuron sum measurement circuitry 210 by lowering both SMO_SELA and SMO_SELB. This assumes that EN_DRIVE is active (TTL high).

The component voltages are buffered by followers with unity gain before being presented to the ADC 220. The component voltages are also differentiated and SUM_OFST is added to the result. This value is divided by 2 prior to digitization by the ADC 220. The control is primarily used to place the actual voltage into the ADC 220 measurement window.

When not in use, the buffers and differential amplifier inputs are left floating with the only ground source being the open CMOS switch with $\approx 3\,\Omega$ to ground. No oscillation should occur, but floating inputs are possible.

The Analog to Digital converter 220 translates these 0 to 5 VDC levels to a digital value with a resolution of 1.22 mV per step.

From the component portions of the SUM Output signals, SMO+ and SMO− use the formula:

$$\text{VOLTAGE} = 5 * \left( \frac{\text{VALUE}}{4095} \right)$$

For the differentiate signal, the voltage is allowed to range form −5 V to +5 V that can be attributed to the SUM Output monitoring. The OFFSET signal can shift this voltage positively by up to 5 V. The result is a signal that can range from −5 V to +10 V. This is further divided by 2 resulting in a −2.5 V to +5 V signal range, 2.5 V of which is attributable to OFFSET. A range this wide is not detrimental to the ADC. The appropriate use of the signals is to use OFFSET to slide the SUM Output values into the range of the ADC much like using a vertical position control on an osciliscope. Using an offset of 2048 will allow the entire voltage range to be viewed while ignoring OFFSET for the duration. The resultant formula is:

$$\Delta\text{VOLTAGE} = \left( 10 * \left( \frac{\text{VALUE}}{4095} \right) \right) - \left( 5 * \left( \frac{\text{OFFSET\_VALUE}}{4095} \right) \right)$$

PERTURBATION CIRCUITRY

The perturbation circuitry 211 handles neuron perturbation via the SMO+ and SMO− signals. This pair of signals give direct access to the internal differential neuron summing nodes. The particular neuron is selected with the ETANN address lines (BD16-31). Each of these signals represent one component of the neuron summing function. The intent of this circuitry is to perturb the neuron by shunting a measured amount of current to ground from each component. Only component values can be applied since there is no circuitry provided to divide the perturbation value into its' components or to determined common mode offsets. This task is left up to the software.

To perturb the neuron, a pair of software controlled DACs set current sink levels for their assigned neuron summing components. Two current ranges are provided: 0 to 19.99 μA and 0 to 2.02 mA. The current range is selected by a CMOS level signal called P_LOWI*. When P_LOWI* is low, the 0 to 19.99 μA range is selected, and when high, the 0. to 2.02 mA range is selected. Within the selected current range, the actual sink values are controlled by PERT_POS_VAL for SMO+, and PERT_NEG_VAL for SMO−. The resulting resolutions are 0.00488 μA per step in low range, and 0.4888 μA per step in high range.

A dual 1 to 4 multiplexer 208 is used to connect the SMO+ and SMO− to the perturbation sinks by lowering SMO_SELA and raising SMO_SELB. This assumes that EN_DRIVE is active (TTL high).

The current sink itself is composed of a sense resistor whose value is changed by P_LOWI*, and a FET/TRANSISTOR pair whose conductivity is controlled by an opamp. The voltage developed across the sense resistor is compared against the scaled value provided by the DAC and the opamp drives the FET/TRANSISTOR pair as needed to match these two values. An ideal current sink would always hold its' load voltage at 0 V, however, due to the low current involved, a large value sense resistors were needed which allow the load voltage to approach +1 V at maximum current sink. This value is acceptable for this application.

DACs 0×44 and 0×45 drive the pertabation current sinks and the formula for DAC voltage was given above. The DAC to current formula is as follows:
if P_LOWI* is low (bit 2 in 0×5E), use:

$$\text{CURRENT (in μA)} = 19.982 * \left( \frac{\text{VALUE}}{4095} \right) \text{or,}$$

$$\text{VALUE} = 4095 * \left( \frac{\text{CURRENT (in μA)}}{19.982} \right)$$

if P_LOWI* is high (bit 2 in 0×5E), use:

$$\text{CURRENT (in μA)} = 2018.2 * \left( \frac{\text{VALUE}}{4095} \right) \text{or,}$$

$$\text{VALUE} = 4095 * \left( \frac{\text{CURRENT (in μA)}}{2018.2} \right)$$

REVERSE SOCKET DETECTOR

Since the ETANN can be installed in four (4) different orientations, it is important to verify correct ETANN orientation prior to disabling the ETANN socket isolation. Correct ETANN placement is ensured with part position and reverse socket detection circuitry 212. The ETANN has four digital ground pins which are always connected internally and are not symmetrical about the package. Therefore, a low voltage ohm meter can be used to determine the location of two of the four digital ground pins in each of three orientations. When the ETANN is correctly oriented, the ohm meter will simply read ground at any of the ground sites; however, in all three of the illegal orientations, no ground pin is connected to ground. Thus, if the expected pin locations are tested for continuity, the exact orientation can be determined and reported.

In the preferred embodiment, the GUPI has a built-in reverse socket tester, which is used by the adapter with a part presence detector 222. To ensure the presence of a clamp diode, a digital input pin A0 is used for the test. The input pin drive signal is rounted through the GUPI so the adapter buffers can be isolated during the test. The GUPI applies a very low voltage of −12 V to the input pin A0 in order to look for a clamp diode. If present, a comparator internal to the GUPI will measure 0V to −0.81V and will report that the device exists via the GUPI status register. Otherwise, the comparator will see −12V and will report an empty socket. The GUPI status register is a component of the GUPI which is a well known apparatus.

The logic of determining the correct placement and orientation requires the following steps:
1. Ensure power is off.

2. Isolate the device if not already isolated.
3. Enable the part position test with LD3 (PPT_EN).
4. Test continuity between socket pins K4 and K14 of device socket 223 by reading the ADC 220 at address 0×50.
5. If the measurement is less than 0.3Vdc the device needs to be rotated 90 degrees clockwise.
6. Test continuity between socket pins P8 to D8 of device socket 223 by reading the ADC 220 at address 0×51.
7. If the measurement is less than 0.3Vdc the device needs to be rotated 90 degrees clockwise.
8. Test continuity between socket pins D10 to P10 of device socket 223 by reading ADC 220 at address 0×52.
9. If the measurement is less than 0.3Vdc the device needs to be rotated 270 degrees clockwise.
10. If all three test have failed (the measurement showed open or 500 mV), the part is either not installed or it is oriented correctly. Next, test for part presence to find out whether or not the part is installed or not.
10A. Turn on DT_RVSKI with control word 1 bit 1.
10B. If bit 4 of the GUPI status register (port 2) is high then the device is installed correctly. 11. If steps 1 through 10 have failed, the part is not installed.

Additionally, it will be necessary to determine if the Confidence Test Module (CTM) is installed in the adapter socket. If the software has determined that the ETANN is not installed, the software should then disable socket isolation, set the ETANN address to 0, set VREF1 to a known value, and test for that value at NO (Neuron Out). In the preferred embodiment, two (2) values are applied to VREF1 and both values are verified at NO. If NO tracks VREF1 (within allowable error tolerances), it can be assumed that the CTM is installed and the software can now enter a 'test mode'. Naturally, this test would be done by a confidence program or some other factory based utility for the purpose of troubleshooting. The connection and relationship between VREF1 and NO is not natural for the ETANN, but is required for testing adaptor integrity.

The software logic does not need to test for any test apparatus unless the socket has just been deemed empty. This means that the clamp diode on A0 must not be seen by the device presence test. To do this, a 2KΩ resistor can be installed in series with the A0 line and any device that needs to be connected to that logic level. It is very important to re-isolate the socket as soon as possible when this test is completed since the user may decide to plug in an ETANN at any time.

ON BOARD FIRMWARE

The adapter 104 provides means for program storage local to the adapter using program storage circuitry 213. When establishing communications with an adapter, the host computer copies this program code from the adapter into local host computer memory and then places calls into this code. This allows each adapter to have its own unique code. The code is stored in a 27C64 EPROM (Electrically Programmable Read Only Memory) 224 and read out to the AD0-7 bus through 74ALS244 buffers 225. The EPROM 224 and buffers 225 are well known and commonly available electronic components.

The EPROM 224 is divided into two pages of 4K each. On reset the lower page is selected. The specific page can then be selected by writing to bit one of the adaptor MODE register. An onboard address counter is reset to zero at powerup or when RESET* signal is active (low) or when UPLOAD is active (high). To read a byte, RDPERFW* is lowered which enables the byte onto the AD0-7 bus. On the raising edge of RDPERFW* the address counter is incremented. The first two bytes read contain the length of the code. RDPERFW* is active when reading port 0×11.

To aid diagnostics software in the preferred embodiment, the contents of the two EPROM pages contain functionally identical code, but have a constant or string that is different. This difference allows identification of the different pages when trouble-shooting, and gives two distinct checksums (one for each page) which are used to prove that the paging mechanism didn't fail. If diagnostics software attempts to read both pages, and both pages have the same checksum, then the paging mechanism can be considered defective. If the page read can be identified, then the mode of the failure will also be known.

ISOLATION SWITCHES

To provide a safe environment for installing an ETANN into the adapter socket, all load (input) pins and source (output) pins are brought to a floating or open status. The only exception is VPP1 and VPP2 which are brought to ETANN Vcc (0V if the socket is isolated) potential with 200Ω impedance and 40 mA current limiting.

The analog load pins are isolated using CMOS bilateral switches 201. Most of the analog source pins are isolated by disabling the input analog multiplexers they drive with the rest being isolated with CMOS bilateral switches 201. The logic signals are isolated using 74ALS244 buffers in tri-state. A signal named EN_DRIVE (LZ12 on the GUPI) enables and disables the isolation as well as enabling and disabling the ETANN power supply 214.

The isolation feature serves to protect the ETANN from illegal potentials during insertion and extraction from the adapter socket. Isolation also serves to protect the adapter from many extraneous voltages.

The power supply takes 1 second to discharge to a safe state. The software keeps a socket activity LED on for 1 second after EN_DRIVE has been brought low. This should keep the user from removing or installing any device while the power supply is discharging.

ETANN POWER SUPPLY

The target power supply, in the GUPI, is incapable of driving the ETANN. Therefore, a separate power supply and regulator 214 is provided on the adaptor. This power supply 214 regulates the +12 V rail down to +3 V to +6.5 V, or isolation depending upon the control inputs. Rather than adding a DAC just for this supply, the GUPI target supply is used as a control voltage and EN_DRIVE enables and disables the supply to provide isolation.

In the preferred embodiment, the power supply regulator 214 is of the switching variety using pulse width modulation at a base frequency of 100 Khz. The +12 V input supply is LC filtered to reduce noise injection back into that source. The output is LC filtered after the main storage elements to reduce the ripple below 20 mV Peak to Peak. This regulator is capable of providing 500 mA at +5 V to the ETANN socket.

ADAPTER LOGIC

The bulk of the logic requirements of the adapter 104 are contained in a single user programmable gate array (PGA) 226. In the preferred embodiment, PGA 226 is implemented using an XC3042-70 programmable gate array available from Xilinx Corporation, San Jose, Ca. Such devices are well known and commonly available electronic devices. The remaining adapter logic not contained in the PGA 226 includes the ETANN address, mode and control buffers, and the firmware in EPROM 224.

PGA 226 is a RAM based device which needs to read in its configuration data on the first rising edge of the Reset signal after power has been restored. Once restored, the Reset pin resets the user logic internal to the PGA 226. Configuration time is divided into 2 main parts. From 'Vcc>3 V' to 'ready to sample reset', is a maximum of 131 mS. From 'sampling reset and finding it inactive' to 'entering user operation' is 62 mS. The duration from 'first sampling reset' to 'its actually going active' is controlled by the host computer 101. The configuration data is stored in an 8 pin, bit serial PROM 227 that has more than enough room for the PGA 226 bitmap pattern.

In the preferred embodiment, the PGA 226 is approximately 70% full and uses 93% of its user I/O pins. Seven major functional blocks are contained within its domain.

1. A state machine that drives a DAC for the purpose of measuring ETANN weights using a binary search pattern.
2. An Address decoder capable of uniquely decoding all adaptor resources. (Note that some of the resources only need a major block decoding and can do the fine decoding locally)
4. A bus multiplexer that is responsible for routing all adapter resources onto a single 8 bit bus, LSB or MSB, based on the current address.
5. An address generator for the firmware EPROM 224. This counter provides 12 bits of count with an added page bit. The intended target EPROM is a 27C64.
6. The clock and hold lines are routed through PGA 226 to support hardware clocking.
7. The NE* and CE* lines are inverted to provide a high after reset, since the GUPI outputs all go low after reset.

Additional logic is used internally to link the blocks together.

CONFIDENCE TEST MODULE (CTM)

The confidence test module (CTM) is a plug-in device that is inserted into the adaptor target socket and is used to verify adapter functionality each time power is applied to the system (before an ETANN chip is installed in the target socket). Because it ensures that the adapter is completely functional before chip installation, it prevents possible damage to the ETANN chip.

The CTM consists of three device orientation detection check circuits, two 16-channel analog multiplexers, one 2-channel 4-input analog multiplexer, a loopback circuit, and a state sequencer.

The orientation detection check circuits produce three signals. These signals simulate that an ETANN chip is installed clockwise from the proper position by 90, 180, or 270 degrees.

The 16-channel and 2-channel multiplexers sequence the simulated ETANN chip signals to the target socket neuron output line for measurement by the present invention.

The loopback circuit provides for connecting, under diagnostic software control, inputs I0 through I63 to outputs N0 through N63 for measurement. All of these lines except N32 and N33 are directly supplied by inputs. The signals applied to outputs N32 and N33 are switchable, under software control and can be either inputs I32 and I33, respectively, or DAC calibration voltages 4.9979 V and 610 uV, respectively.

The state sequencer is a state machine with 50 states, with each state used to control connection of one simulated ETANN chip signal to the target socket neuron output line. States 0 through 33 control connection of 32 individual lines to the neuron output line for verification. States 34 through 41 measure and decide the voltage on the target socket SMOP pin to derive the synapse current into the SMOP pin. States 42 through 45 measure and divide the voltage on the SMOP pin to derive the synapse current into the target socket SMON pin. States 46 through 48 test the ETANN chip orientation circuits.

Host Computer Software of the Preferred Embodiment

The host computer software of the present invention is described in the following sections.

The host executive program of the present invention is an executable software module running in the host computer that allows a user to interface with and manipulate or simulate the ETANN chip. Since the preferred embodiment of the present invention employs an IBM PC with a DOS operating system as a host computer, the host executive program described herein is DOS compatible. It will be apparent to those skilled in the art that the present invention may be practiced using other computer systems and other operating systems.

The host executive program provides a combination of a windowed human interface and a command-line interface, an internally and externally accessible set of subroutines that access all primitive functions of the ETANN chip, and an internally accessible set of low-level input/output routines that provide direct access to the ETANN chip interface software.

In the preferred embodiment, the host executive program is invoked using a command input on the host computer keyboard. Using the various keys, the user can select windows containing the various function invocation options, including extensive on-line help. Text input is possible with some commands, one of which supports the user-written application invocation. This command allows the user to invoke an application from the host executive and have it execute to completion. The host executive program may be used to directly manipulate an ETANN chip installed in the adapter target socket or used to simulate the operation of the ETANN using a software simulator.

The host executive program also serves as an interruptive server process (parent) for programs that it has spawned (child processes). All user applications and supported simulators are spawned from the parent process (i.e. the host executive) and communicate with the parent using DOS interrupts and the interface code contained in an interface library file linked with the user program object module. Both parent and child processes reside in the lower 640 kb of DOS memory space. Thus, the parent process is limited to 150 kb in size to allow the largest possible space for simulation platforms and user applications.

Various operations of the present invention may be activated by selecting items from a menu. Three of these menu options are the simulator option, the diagnostic option, and the ETANN menu option. Invoking the simulator menu option spawns the simulator of choice. Within the simulator, the user can specify either "off-line" or "on-line" operation. Off-line operation causes all operations within the simulator to act on a logical representation of a neural network. On-line operation causes the operations within the simulator to be redirected to the ETANN chip. The result is that the simulator algorithms are used to drive the actual training, downloading, and verification of the ETANN chip. Altering the environment be selecting on-line mode uses DOS interrupt communications forms.

Invoking the diagnostic menu option spawns a diagnostic package and allows the user to interactively execute the diagnostic tests included in the CTM. The diagnostic program tests much of the functionality of the adapter and reports its results on the host computer monitor. The host diagnostics program allows the user to determine if the adapter is operational. Its use requires that the CTM be installed in the adaptor target socket. It detects at least 95 percent of the stuck-at-1 or stuck-at-0 node faults on all active components. The test produce an on-screen report to identify the failing node.

Invoking the ETANN menu option creates an environment from which the user can perform many discrete operations, such as data input and output, weight (synapse) manipulation, summing node output, and allowing the user to install another ETANN chip in the adaptor socket. Each of these three menu options are described in more detail below along with the other menu options provided by the present invention.

The ETANN application programmer's interface (also known as the training system interface library, or TSIL) is a set of software routines that perform the basic high-level manipulation of the ETANN chip resources. The TSIL serves as an interface to the routines (located in the Training System Interface Core, or TSIC) that actually do the real work. The TSIL interface is invoked using a DOS interrupt and an established set of register locations and user stack values. All application programs that use the TSIL must be spawned from the host executive program.

The TSIL is the library file that the user links to the application program object module. It contains entry points into a body of 80×86 assembly language code. Upon entry to any routine called by the application program, the AX register is loaded with and ID value (identifying the particular action to be taken) and the DX register pair is loaded with a FAR pointer value that references the application program stack. This stack reference is adjusted prior to insertion into the DX register to reference the actual parameters passed to the TSIL subroutine being called. In this fashion, the subroutines in the TSIC code space are able to receive the parameters for a call directly from the application program stack. The linkage between the TSIL and the TSIC is achieved using a DOS interrupt between 0F0H and 0F.

The TSIL includes a file of definitions that are directly importable as an "include" directive in the C programming language. The TSIL definition file contains all necessary minimum, maximum, and nominal values that define the constants for manipulating various ETANN chip resources. It contains all necessary type definitions for defining the parameters to all subroutines supported by the TSIL. It also contains all necessary subroutine declarations that are directly callable by the application program. This file serves only as a source for the "definitions" for the functional interface to the ETANN chip.

All resources of the ETANN chip are accessible using the TSIL; including such operations as synaptic cell programming, cell measurement, sigmoidal gain manipulation, and neuron input and output.

The training system interface core (TSIC) is the main body of code that serves as the interface between the user application programs communicating via the DOS interrupt and the PCPP Monitor/Control Software communicating via a serial channel. The TSIC is a group of subroutines that are linked with the host executive program and are entered upon receipt of an interrupt and appropriate vector to the correct routine. Application program data are collected and organized into a "data packet" and transmitted to the PCPP monitor for action on the adaptor. Upon receipt of a reply from the PCPP monitor, the appropriate response (output data or status message) is placed on the application program stack for action by the caller.

The PCPP monitor/control software consists of two parts: monitor programs, and ETANN chip control programs. In the preferred embodiment, both parts were written in 8085 assembly language for execution on a PCPP. The monitor program initializes the PCPP/GUPI to a known "safe" state. Once the PCPP/GUPI hardware is initialized, the PCPP monitor/control software receives data transmissions from the host computer and passes those transmissions to the ETANN chip control programs and returns the data to the host computer. The ETANN chip control program interprets directives form the TSIC library subroutines and performs the appropriate control sequences on the adaptor.

The menu system of the present invention is represented on the display screen by the menu bar across the top line of the display. The menu system offers easy command selection. Means for selecting commands from a menu in this manner are well known to those skilled in the art. Some functions of the present invention system can be accessed only through the menus; others are accessible only through the entry of a command line entered by use of the computer keyboard.

The display screen of the present invention is divided into framed areas called windows. Some of these windows are optional; others are always present. The present invention uses each window for a different purpose. Only one window is active at any given time; commands can be issued in the active window. The title box for the active window is highlighted. At sign-on, the File window is active.

The two main elements of the menu system of the present invention include:

1. The top line of the screen is called he Menu bar. The Menu bar lists five menu names (File, Simulator, ETANN, Diagnostics, and Help), each of which can be used to select a pull-down menu. Each pull-down menu includes a list of commands from which the user can select commands. Only one menu can be pulled down at a time.

2. A Command window is the area in which the user enters commands using the keyboard at a command-line prompt. When the Command window is active, the Command title-line is highlighted, and a cursor appears at the command-line prompt.

Selecting a command item is accomplished by entering commands, in either of two ways: 1) Commands may be selected from a menu, or 2) Commands may be entered at the prompt in the Command window. In order to select commands from a menu, the Menu bar is used. Menus that pull down from the Menu bar include the following menus: File, Simulator, Diagnostics, ETANN, and Help.

The File menu contains utility commands for running host operating system commands and exiting from the present invention system. Techniques for running these utility commands are well known in the art.

The Simulator menu contains the commands that provide access to the simulator(s) that simulate the operation of an ETANN device. Simulators for this purpose are well known and available in the prior art.

The Diagnostics menu contains the command that provides access to the diagnostics program of the present invention. The sub-menu contained under the Diagnostics menu includes the following operation: System Test. The System Test operation invokes the system diagnostic software of the present invention.

The ETANN menu is used to pull down a more detailed sub-menu that provides access to the commands associated with the ETANN chip. The sub-menu contained under the ETANN menu includes the following operations: Prepare Chip, Upload Weights, Download Weights, and Neuron I/O.

The Prepare Chip operation initializes the ETANN chip for training operations. The Upload Weights operation uploads the contents of the ETANN chip to the file that is specified by the user. This operation is useful as a training tool because it allows the user to examine the contents of the file. The Download Weights operation prompts the user for the name of the file that the user wishes to download to the ETANN chip. The requested file is then downloaded to the ETANN. The Neuron I/O operation is used to perform input/output to a particular neuron of the ETANN.

The Help menu contains commands that provide access to the on-line help facilities of the present invention. Methods for providing help to a user are well known to those of ordinary skill in the art.

The following section lists and describes the training system interface library (TSIL) subroutine calls visible to the user. Note that the detailed descriptions include definitions, header, and calling structure for each visible C routine. It will be apparent to those skilled in the art that the constructs given below may be implemented in a programming language other than C.

The following definitions are used in defining variables that are to be passed to the TSIL subroutines. Every TSIL subroutine returns status information the storage of which in the application program is assumed to be of type Status T.

| typedef unsigned char | ORD1 |
| typedef unsigned int | ORD2 |
| typedef unsigned long | ORD4 |
| typedef char | INT1 |
| typedef int | INT2 |
| typedef long | INT4 |
| typedef double | REAL8 |
| typedef ORD2 | StatusT |

The universal "good" status return value for values of type StatusT is as follows:

```
#define OK 0
#define REV_STR_SIZE 12
struct InfoStruct
{
    char ETANNversion[REV_STR_SIZE];
    char HWversion[REV_STR_SIZE];
}   etann_info;
```

The predefined library constants include the following status return values:

```
#define CTM_present 1 /* status return from connect_etann
#define chip_90degrees_clockwise 2 /* status return from
                                       connect_etann
#define chip_180degrees_clockwise 3 /* status return from
                                       connect_etann
#define chip_270degrees_clockwise 4 /* status return from
                                       connect_etann
#define chip_socket_empty 5 /* status return from connect_etann
```

Definitions for maximum and minimum values for chip parameter in the routine set_etann_parameters include the following:

```
#define MAX_CHIP_INDEX 0 /* maximum value for chip
                            parameter in
                            set_etann_parameters */
#define MIN_CHIP_INDEX 1 /* minimum value for chip
                            parameter in
                            set_etann_parameters */
```
Definitions for number of neurons per layer include:
```
#define FEEDFORWARD 0 /* selects first neuron layer */
#define FEEDBACK 1 selects second neuron layer */
```

Definitions for two neuron layers in ETANN that can be passed to the routine set_etann_parameters include:

```
#define NEURONS_PER_ARRAY 128 */ ETANN supports
                                  64 or less neurons
```

Definitions for minimum and maximum values that can be passed to the routine write_neuron_inputs include:

```
#define MIN_NEURON_VALUE -1.0 /* minimum input/
                                 output value for cell */
#define MAX_NEURON_VALUE +1.0 /* maximum input/
                                 output value for cell */
#define MIN_NEURON_INDEX 0 minimum index for
                            neuron */
#define MAX_NEURON_INDEX 63 /* maximum index
                               for neuron
```

Definitions for a number of synaptic junctions between neurons include:

```
#define SYNAPSES_PER_NEURON 64 /* number of
                                  synapses/neuron */
```

Definitions for a minimum and maximum value that can be passed to the routine set_weights include:

```
#define MIN_SYNAPSE_VALUE -2.5 /* minimum weight
                                  value for cell */
#define MAX_SYNAPSE_VALUE +2.5 /* maximum weight
```

```
value for cell */
#define MIN_SYNAPSE_INDEX 0 /* minimum index for
    synapse */
#define MAX_SYNAPSE_INDEX 63 /* maximum index for
    synapse */
```

Definitions for bias units per neuron include:

```
#define BIASES_PER_NEURON 10 /* usable bias units/
    neuron */
#define ACTUAL BIASES_PER_NEURON 10 /* actual bias
    units/neuron */
```

Definitions for minimum and maximum values that can be passed to the routine set_bias_weights include:

```
#define MIN_BIAS_VALUE -2.5 /* minimum weight value
    for cell
#define MAX_BIAS_VALUE +2.5 /* maximum weight value
    for cell
#define MIN_SYNAPSE_INDEX 0 /* minimum index
    for "bias" */
#define MAX_SYNAPSE_INDEX 9 /* maximum index
    for "bias" */
```

Definitions for minimum and maximum values that can be passed to the routine set_sigmoid_gain include:

```
#define DEFAULT_SIGMOID_VALUE 5.0 /* voltage
    nominal */
#define DEFAULT_SIGMOID_VALUE 0.0 /* voltage
    minimum */
#define DEFAULT_SIGMOID_VALUE 5.0 /* voltage
    maximum */
```

Definitions for minimum and maximum values that can be passed to the routine set_voltage_reference_input include:

```
#define DEFAULT_VREFI_VALUE 1.5 /* voltage nominal */
#define MIN_VREFI_VALUE 0.0 /* voltage minimum */
#define MAX_VREFI_VALUE 2.5 /* voltage maximum */
```

The functions supported in the TSIL are listed and described in the following section.

initialize_TSIL
  This function performs setup and obtains ETANN chip-specific information.
initialize_ETANN
  This function sets ETANN chip synapses to nominal (0) values and prepares chip for use in application.
connect_etann
  This function turns power-on and initializes ETANN chip.
disconnect_etann
  This function turns power off and sets ETANN chip to a "safe" state.
set_etann_parameters
  This function sets ETANN chip-specific globals and conditions.
tsil_error
  This function expands "StatusT" return message into text and data.
set_weights
  This function programs ETANN chip synaptic weight cells.
get_weights
  This function extracts ETANN chip synaptic weight cell values.
set_bias_weights
  This function programs ETANN chip bias weight cells.
get_bias_weights
  This function extracts ETANN chip bias weight cell values.
write_neuron_inputs
  This function passes data through a neural layer.
read_neuron_outputs
  This function obtains output data from a neural layer.
read_neuron_sums
  This function obtains neural summing node output sums.
set_sigmoid_gain
  This function sets gain voltage of ETANN chip sigmoid.
get_sigmoid_gain
  This function obtains gain voltage of ETANN chip sigmoid.
set_voltage_reference_input
  This function sets VREFI voltage on ETANN chip.
get_voltage_reference_input
  This function obtains VREFI voltage on ETANN chip.
set_voltage_reference_output
  This function sets VREFO voltage on ETANN chip.
get_voltage_reference_output
  This function obtains VREFO voltage on ETANN chip Each of the visible subroutines listed above are described in the following section. The calling format and interface structure is presented in the C programming language; however, it will be apparent to those skilled in the art that alternative programming languages may be used.

1. INITIALIZE_TSIL This module sets up and obtains ETANN chip-specific information. An example of a call to this module follows:
  extern StatusT
  initialize_TSIL(struct InfoStruct *data);

The purpose of this module is to return information useful for programmers using this module. A successful call to connect_etann is necessary before calling this subroutine. Upon return from the call, the information in the InfoStruct data region will contain information useful for programming the ETANN chip. An explanation of the input to this module follows:

```
#define REV_STR_SIZE    12
struct InfoStruct
{
    char ETANNversion[REV_STR_SIZE];
    char HWversion{REV_STR_SIZE]
} etann_info:
```

An example of the use of this module follows:

```
#include "tsil.h"
... tsil.h predefines a variable of type ...
    "infoStruct" (named "etann.info") for the user.
```

-continued

```
initialize_TSIL(&etann.info);
```

2. INITIALIZE_ETANN This module sets up ETANN chip for programming. An example of a call to this module follows:
   extern StatusT
   initialize_etann();

The purpose of this module is to prepare an ETANN chip for neural network programming. This routine is called before programming an ETANN device with a new application. Prior to a new download and training of an ETANN device, the device resources are programmed to a NULL state; this state ensures that synapses and biases containing possibly unknown values do not affect the outcome of the neural network behavior expected after an application has programmed other cells. All synapse weight values are programmed to 0.0 (midpoint). All user-visible bias units cell pairs are programmed to maximum VT setting (no effect).

The parameters returned by this module include the following:
   0: Successful
   Other: ERROR;

3. CONNECT_ETANN This module turns power on and initializes the ETANN chip. An example of a call to this module follows:
   extern StatusT
   connect_etann();

The purpose of this module is to perform a power-on of the ETANN chip and to determine if the ETANN is installed correctly. Power is maintained until subroutine disconnect_etann is successfully called, or the host PC is powered-down. The module performs a part-position-test to determine the status of the device (if any) currently installed in the adaptor socket. If the part-position-test phase passes, the following conditions are set:

5.0 V are applied to device in the socket (ETANN chip or CTM). The Voltage Reference Input is set to nominal. The Voltage Reference output is set to nominal. The Sigmoid Gain is set to nominal. The VT_threshold is set to nominal. All neuron inputs are set to 0 in all arrays. The Adaptor Socket Activity LED is lighted.

The parameters returned by this module include the following:
Normal—Power Applied:
   0=ETANN chip installed correctly, power applied.
   1=CTM present, power applied.
Errors—No Power Applied:
   2=ERROR: ETANN chip detected, 90 degrees clockwise.
   3=ERROR: ETANN chip detected, 180 degrees clockwise.
   4=ERROR: ETANN chip detected, 270 degrees clockwise.
   5=ERROR: No ETANN chip detected; no CTM detected.
An example of the use of this module follows:

```
#include "tsil.h"
main( )
{
    StatusT status;
    ORD1 subsys, errcode, severity;
    #define max_size 256
```

-continued

```
    char error_message[max_size];
    initialize_TSIL (&etann_info);
    ... select chip 0, layer 0 ...
        set_etann_parameters (0,0);
    ... attempt to connect to the ETANN chip.
    status = connect_etann( );
    if (status ! = OK)
    {
        tsil_error(status, max-size, error_message,
            &subsys, &errcode, &severity);
        printf(" nERROR in connect: %s", error_message);
    ... do not continue (return to INNTS.EXE) because all future
    operations will fail.
        exit(0);
    }
```

4. DISCONNECT_ETANN This module turns power off and sets ETANN chip to "safe". An example of a call to this module follows:
   extern StatusT
   disconnect_etann()

The purpose of this module is to perform a power-down of the device in the adaptor socket (ETANN chip or CTM). This subroutine must be called if the red LED on the adaptor is lighted (connect_etann has been called successfully). Power is removed and the socket isolated from all signals. The device may be removed from the socket upon completion of this call. A new device may be installed in the socket, and then successfully activated using connect_etann.

An example of the use of this module follows:
   disconnect_etann();

5. SET_ETANN_PARAMETERS This module sets ETANN chip-specific globals and conditions. An example of a call to this module follows:
   extern StatusT
   set_etann_parameters (ORD chip, The purpose of this module is to set values within the parent process that are used by the ETANN chip interface code as parameters to the adaptor hardware. Once set, the values are used by other subroutines (i.e. write_neuron_inputs, set_weights). The values passed for chip and array are used whenever directives are made to the adaptor control software and hardware. The chip parameter directs future operations to the specified ETANN chip. The array parameter directs future operations to either of two "arrays" of neurons. There are two such arrays, or "layers", in the ETANN chip.

The parameters returned by this module include the following:
   0: Successful
   Other: ERROR:
   Value for chip is out of range.
   Value for array is out of range.
An example of the use of this module follows:

```
    ORD1 chip, array;
... set up operations on chip in socket 0
    chip = 0;
    array = FEEDFORWARD
    status = set_etann_parameters (chip, array);
... perform operations on layer 0 resources.
... now switch to the next array
    array = FEEDBACK;
    status - set_etann-parameters (chip, array);
... perform operations on layer 1 resources.
```

6. TSIL_ERROR This module expands "StatusT" return into text and data. An example of a call to this module follows:

```
extern
tsil_error(StatusT error_code,
                    /* input: Statust code to decrypt */
        ORD1    buflen,
                    /* input: length of error text buffer */
        char return_message[ ],
                    /* in/out: location to place msg */
        ORD1    *subsystem,
                    /* output: subsys that reported err. */
        ORD1    *code;
                    /* output: discrete error code */
        ORD1    *severity0);
                    /* output: returned from this call */
```

The purpose of this module is to decode a status value returned for a TSIL subroutine into an error message, error subcode, module identifier, and severity level. All TSIL subroutines return a status code of type StatusT. Variables of this type (that are returned from the TSIL subroutines) are encrypted. This subroutine decrypts the status information into useful information. An explanation of the input to this module follows:

| Inputs: | |
|---|---|
| error_code | A value returned from another TSIL call. |
| buflen | The length (in bytes) of the array return_message. |
| return_message | A character array in which the decoded error message text is placed. |
| Input/Outputs: | |
| subsystem | The address of a variable in which the subsystem identifier will be place. This identifies the component that generated the original error. |
| code | The address of a variable in which the low-level error code will be placed. |
| severity | The address of a variable in which the severity of the message will be placed. |

An example of the use of this module follows:

```
#define max_size 256
ORD1 subsys, errcode, severity;
char error_message[max_size];
StatusT status;
status = connect_etann( );
if (status ! = OK)
{
    tsil_error(status, max_size, error_message,
                &subsys, &errcode, &severity);
    printf("\nERROR in connect: %s. error—message);
}
```

7. SET_WEIGHTS This module programs an ETANN chip synaptic weight cell. An example of a call to this module follows:

```
extern StatusT
set_weights(ORD2 neuron_index,
            ORD2 synapse_index,
            ORD2 count,
            REAL8 data[]);
```

The purpose of this module is to set synaptic weight values on the ETANN chip and in the array previously set with set_etann_parameters. The values in data are used to set the synaptic weight of a cell pair on an ETANN chip. An explanation of the input to this module follows:

| neuron_index | An index that determines the neuron body addressing. The valid range is MIN_NEURON_INDEX . . . MAX_NEURON_INDEX. |
|---|---|
| synapse_index | An index that determines the specific cell pair to manipulate according to the neuron body selected. The valid range is MIN_SYNAPSE_INDEX . . . MAX_SYNAPSE_INDEX. |
| count | The number of consecutively placed synapses to program. The valid value for count must not exceed the number of SYNAPSES PER NEURON. One method is to use: count = (MAX_SYNAPSE_INDEX - synapse_index) + 1; where the count plus synapse_index must be less than SYNAPSES PER NEURON. |
| data | The value(s) to which the synapse will be set. Data must fall within the range MIN_SYNAPSE_VALUE . . . MAX_SYNAPSE_VALUE. |

The parameters returned by this module include the following:
0: Successful
Other: ERROR;
An example of the use of this module is as follows:

```
ORD1 chip, array, i;
REAL8 weight_values[SYNAPSES_PER_NERUON];
. . . set up operation on chip in socket 0 . . .
    chip = 0
. . . program all cells to 0.0 on neuron zero in both arrays. . .
    for (i = 0; i < SYNAPSES_PER_NEURON; i++)
    weight_values[i] = 0.0;
    for (array = 0; array < 2; array++)
    {
        status = set_etann_parameters (chip, array);
        status = set_weight (0,
            SYNAPSES_PER_NEURON,
            weight_values);
```

8. GET_WEIGHTS This module extracts ETANN chip synaptic weight cell values. An example of a call to this module follows:

```
extern StatusT
get_weights(ORD 2    neuron_index,
            ORD2     synapse_index,
            ORD2     count,
            REAL8 data[]);
```

The purpose of this module is to measure synaptic weight values on the ETANN chip and in the array previously set with set_etann_parameters. The current synaptic weight values for a consecutive series of synapses is measured and returned to the caller. An explanation of the input to this module follows:

| neuron_index | An index that determines the neuron body addressing. The valid range is MIN_NEURON_INDEX . . . MAX_NEURON_INDEX. |
|---|---|
| synapse_index | An index that determines the specific cell pair to measure according to the neuron body selected. The valid range is MIN_SYNAPSE_INDEX . . . MAX_SYNAPSE_INDEX. |
| count | The number of consecutively placed synapses |

-continued

| | |
|---|---|
| | to measure. The valid value for count must not exceed the number of SYNAPSES PER NEURON. One method is to use: count = (MAX_SYNAPSE_INDEX - synapse_index) + 1; where count plus synapse_index must be less than SYNAPSES PER NEURON. |
| data | A buffer in which the measured values will be written. Data will fall within the range MIN_SYNAPSE_VALUE ... MAX_SYNAPSE_VALUE. |

The parameters returned by this module include the following:
0: Successful
Other: ERROR
An example of the use of this module follows:

```
ORD1 chip, array, i;
REAL8 weight_values[SYNAPSES_PER_NEURON];
... set up operations on chip in socket 0 ...
    chip = 0
... read all cells to 0.0 on neuron 0 in both arrays ...
    for (i = 0; i < SYNAPSES_PER_NEURON; i++)
        weight_values[i] = 0.0;
for (array = 0; array < 2; array++)
{
    status = set_etann_parameters(chip, array);
    status = get_weights(0, 0, SYNAPSES_PER_NEURON,
            weight_values);
}
```

9. SET_BIAS_WEIGHTS Programs ETANN chip bias weight cells. An example of a call to this module follows:

```
extern StatusT
    set_bias_weights(ORD2 neuron_index,
                     ORD2 bias_index,
                     ORD2 count,
                     REAL8 data []);
```

The purpose of this module is to set bias weight values on the chip and in the array previously set with set_etann_parameters. The values in data are used to set the bias weight of a cell pair on an ETANN chip. An explanation of the input to this module follows:

| | |
|---|---|
| neuron_index | An index that determines the neuron body addressing. The valid range is MIN_NEURON_INDEX ... MAX_NEURON_INDEX. |
| bias_index | An index that determines the specific cell pair to manipulate according to the neuron body selected. The valid range is MIN_BIAS_INDEX ... MAX_BIAS_INDEX. |
| count | The number of consecutively placed "bias units" to program. The valid value for count must not exceed the number of BIASES_PER_NEURON. One method uses: count = MAX_BIAS_INDEX - bias_index + 1 where count plus bias must be less than BIASES_PER_NEURON. |
| data | The value(s) to set the bias value(s) to. Data must fall within the range MIN_BIAS_VALUE ... MAX_BIAS_VALUE. |

The parameters returned by this module include the following:
0: Successful
Other: ERROR
An example of the use of this module follows:

```
ORD1 chip, array, i;
REAL8 weight_values[biases_per_neuron];
... set up operation on chip in socket 0 ...
    chip = 0
... program all cells to 0.0 on neuron 0 in both arrays ...
    for (i = 0; i < BIASES_PER_NEURON; i++)
        weight_values[i] = 0.0;
for (array = 0; array <; array ++)
{
    status = set_etann_parameters (chip, array);
    status = set_weights (0,0 BIASES_PER_NEURON,
}
```

10. GET_BIAS_WEIGHTS This module extracts ETANN chip bias weight cell values. An example of a call to this module follows:

```
extern StatusT
    get_bias_weights (ORD2 neuron_index,
                      ORD2 bias_index,
                      ORD2 count,
                      REAL8 data[ ]);
```

The purpose of this module is to measure synaptic weight values on the chip and in the array previously set with set_etann_parameters. The current synaptic weight values for a consecutive series of bias units is measured and returned to the caller. An explanation of the input to this module follows:

| | |
|---|---|
| neuron_index | An index that determines the neuron body addressing. The valid range is MIN_NEURON_INDEX ... MAX_NEURON_INDEX. |
| bias_index | An index that determines the specific cell pair to measure according to the neuron body selected. The valid range is MIN_BIAS_INDEX ... MAX_BIAS_INDEX. |
| count | The number of consecutively placed "bias units" to measure. The valid value for count must not exceed the nubmer of BIASES_PER_NEURON. One method uses: count = MAX_BIAS_INDEX - bias_index +1 werhe count plus bias must be less than BIASES_PER_NEURON. |
| data | A buffer in which the measured values will be written. Data will fall within the range MIN_BIAS_VALUE ... MAX_BIAS_VALUE |

The parameters returned by this module include the following:
0: Successful
Other: ERROR
11. WRITE_NEURON_INPUTS This module passes data through a neural layer. An example of a call to this module follows:

```
extern StatusT
    write_neuron_inputs(ORD2 neuron_index
                        ORD2 count,
                        REAL8 data [ ]);
```

The purpose of this module is to pass data values through the neuron inputs on the chip and in the array previously set with set_etann_parameters. The values in data are provided as inputs to the neurons selected by:

| | |
|---|---|
| neuron_index | An index that determines the neuron body addressing. The valid range is MIN_NEURON_INDEX ... MAX_NEURON_INDEX. |
| count | The number of inputs to provide to the ETANN chip. The valid value for count must not exceed the number of NEURONS_PER_ARRAY. One method uses: count = (MAX_NEURON_INDEX - neuron_index) +1; where count plus neuron_index must be less than NEURONS_PER_ARRAY. |
| data | The value(s) to which the input value(s) is set. Data must fall within the range MIN_NEURON_VALUE ... MAX_NEURON_VALUE |

The parameters returned by this module include the following:
0: Successful
Other: ERROR
An example of the use of this module follows:

```
ORD1 chip, array, i;
REAL8 input_values[biases_per_neuron];
... set up operation on chip in socket 0 ...
chip = 0
... write all neuron inputs to 0.0 in both arrays ...
for (i = 0; i < NEURONS_PER_ARRAY; i++)
    input_values [i] = 0.0;
for (array = 0; array < 2; array++)
{
status = set_etann_parameters (chip, array);
status = write_neuron_inputs (0, 0, NEURONS_PER_ARRAY,
}
```

12. READ_NEURON_INPUTS This module obtains output data from a neural layer. An example of a call to this module follows:

```
extern StatusT
    read_neuron_outputs(ORD2 neuron_index,
                        ORD2 count,
                        REAL8 data [])
```

The purpose of this module is to obtain the data values of the neuron inputs on the chip and in the array previously set with set_etann_parameters. The values in data are returned from the ETANN chip neuron outputs as selected by:

[neuron_index ... ((neuron_index + count) − 1)]
An example of the input to this module follows:

| | |
|---|---|
| neuron_index | An index that determines the neuron body addressing. The valid range is MIN_NEURON_INDEX ... MAX_NEURON_INDEX. |
| count | The number of outputs to obtain from the ETANN chip. The valid value for count must not exceed the number of NEURONS_PER_ARRAY. One method uses: count = (MAX_NEURON_INDEX - neuron_index) + 1; where count plus neuron_index must be less than NEURONS_PER_ARRAY. |
| data | The value(s) read from the ETANN chip neuron outputs. Data will fall within the range MIN_NEURON_VALUE ... MAX_NEURON_VALUE. |

The parameters returned by this module include the following:
0: Successful
Other: ERROR:

13. READ_NEURON_SUMS This module obtains neural summing node output sums. An example of a call to this module follows:

```
extern StatusT
    read_neuron_sums (ORD2 neuron_index,
                      ORD2 count,
                      REAL8 data [])
```

The purpose of this module is to obtain the data values of the neuron summing node outputs on the chip and in the array previously set with set_etann_parameters. The values in the data parameter are returned from the ETANN chip neuron summing node outputs as selected by:

[neuron_index ... ((neuron_index+count)−1)]

An example of the input to this module follows:

| | |
|---|---|
| neuron_index | An index that determines the neuron body addressing. The valid range is MIN_NEURON_INDEX ... MAX_NEURON_INDEX. |
| count | The number of summing node outputs to obtain from the ETANN chip. The valid value for count must not exceed the number of NEURONS_PER_ARRAY. One method uses: count = (MAX_NEURON_INDEX - neuron_index) + 1; where count plus neuron_index must be less than NEURONS_PER_ARRAY. |
| data | The value(s) read from the ETANN chip neuron summing node outputs. |

The parameters returned by this module include the following:
0: Successful
Other: ERROR:

14. SET_SIGMOID_GAIN This module sets gain voltage on the ETANN chip sigmoid. An example of a call to this module follows:
extern StatusT
set_sigmoid_gain(REAL8 *data);
The purpose of this module is to set the analog sigmoidal gain to a specified voltage level. The value in the data parameter is interpreted as a direct voltage and is used to adjust the sigmoidal gain of the ETANN chip. An explanation of the input to this module follows:
data: A value between MIN_SIGMOID_VALUE and MAX_$_{SIGMOID}$_VALUE.

The parameters returned by this module include the following:
0: Successful
Other: ERROR:

15. GET_SIGMOID_GAIN This module obtains gain voltage of the ETANN chip sigmoid. An example of a call to this module follows:
extern StatusT
get_sigmoid_gain(REAL8 *data);
The purpose of this module is to return the current analog sigmoidal gain voltage level. The current level of the analog sigmoidal gain is returned in the data parameter. An explanation of the input to this module follows:
data: A value between MIN_SIGMOID_VALUE and MAX_SIGMOID_VALUE.

The parameters returned by this module include the following:
0: Successful
Other: ERROR:

16. SET_VOLTAGE_REFERENCE_INPUT This module sets VREFI voltage on the ETANN chip. An example of a call to this module follows:
extern StatusT
set_voltage_reference_input (REAL8 *data);

The purpose of this module is to adjust the voltage reference input (VREFI). The value in the data parameter is interpreted as a direct voltage to drive the input reference voltage to the ETANN chip. An explanation of the input to this module follows:
data: A value between MIN_VREFI_VALUE and MAX_VREFI_VALUE.

The parameters returned by this module include the following:
0: Successful
Other: ERROR:

17. GET_VOLTAGE_REFERENCE_INPUT This module obtains VREFI voltage on the ETANN chip. An example of a call to this module follows:
extern StatusT
get_voltage_reference_input (REAL8 *data);

The purpose of this module is to return the current value of the input reference voltage. The current level of the VREFI level is returned in the data parameter. An explanation of the input to this module follows:
data: A value between MIN_VREFI_VALUE and MAX_VREFI_VALUE The parameters returned by this module include the following:
0: Successful
Other: ERROR;

18. SET_VOLTAGE_REFERENCE_OUTPUT This module sets VREFO voltage on the ETANN chip. An example of a call to this module follows:
extern StatusT
set_voltage_reference_output (REAL8 *data);

The purpose of this module is to adjust the voltage reference output (VREFO). The value in the data parameter is interpreted as a direct voltage to drive the output reference voltage to the ETANN chip. An explanation of the input to this module follows:
data: A value between MIN_VREFO_VALUE and MAX_VREFO_VALUE The parameters returned by this module include the following:
0: Successful
Other: ERROR;

19. GET_VOLTAGE_REFERENCE_OUTPUT This module obtains VREFO voltage on the ETANN chip. An example of a call to this module follows:
extern StatusT
get_voltage_reference_output (REAL8 *data);

The purpose of this module is to return the current value of the input reference voltage. The current level of the VREFO level is returned in the data parameter. An explanation of the input to this module follows:
data: A value between MIN_VREFO_VALUE and MAX_VREFO_VALUE The parameters returned by this module include the following:
0: Successful
Other: ERROR;

Diagnostic Software of the Preferred Embodiment

The objective of the diagnostic software of the present invention is to provide to the user a tool to determine the functionality of the adapter hardware. All tests are performed at the system level using the host computer. The CTM is used with the diagnostic software to test the circuits to and from the ETANN adaptor target socket. It allows for testing all signals that originate in or terminate at the ETANN chip. The diagnostic tests of the present invention are described in the following paragraphs.

The initialization test applies power to the adapter hardware and verifies the operation of the adaptor LED circuit that indicates the socket activity status. This test requires interaction by the operator/observer. It sets the circuits so that the LED would normally be extinguished. It then displays the question:
Is the LED off?
and waits for a response. If the LED does not light (the proper indication), and the operator presses the y (yes) key on the host computer keyboard. The test then sets the circuits so that the LED would normally be lighted. It then displays the question
Is the LED on?
and waits for a response. If the LED lights (the proper indication) and the operator presses the y (yes) key, the test displays the pass message and proceeds to the next test. If the operator presses the n Key (that is, answers no) at either question, the test displays the failed message.

The CTM logic signals test verifies the levels of the logic control signals from the generic universal programmer interface (GUPI) to the CTM. It sets each of the signals in turn to the 0-V and 5-V levels and measures the output level multiplexed to the neural output line. Most of these signals are generated or used by the ETANN chip.

The neural bus test verifies the proper operation of the digital-to-analog converter (DAC 202) bus and read/write logic. It programs DAC 202 to five different voltage levels and connects the DAC 202 output through the CTM to the analog-to-digital converter (ADC 220) logic for output and measurement on the neural output line.

The DAC control logic test verifies the proper operation of the DAC steering logic. It mimics and address path algorithm used in RAM testing by writing and reading a pattern to one DAC of DACs 220, then writing a complemented pattern to all other DACs of DACs 220, then reading from both sets and comparing the patterns. If the patterns are the same, the test reports that an overwrite error occurred.

The neuron bus logic test verifies the proper operation of the entire I0 through I63 and N0 through N63 data bus. It writes to each of the neuron inputs, reads from each of the neuron outputs, one at a time, and measures the output multiplexed to the neuron output line.

The address path test verifies the proper operation of the path for each address bit (A0 through A12). The test sets an individual address to a 1 with all others set to 0 and checks the address line logic for being stuck at 1 or 0. If this loop operates correctly, the test inverts the process, setting individual addresses to 0 and all others to 1.

The part position test verifies the proper operation of the logic that detects the position of the device installed in the adaptor target socket. (The device, either an ETANN or the CTM, can be installed in the proper position; or 90, 180, or 270 degrees clockwise from the proper position.) The test programs the CTM to select each of the three part position lines in turn and measures the ouput level multiplexed to the neuron output line. It also confirms that the open lead logic is functional.

The $V_{PP1}$ and $V_{PP2}$ test verifies the proper operation of the logic that programs the $V_{PP}$ voltages, sets the binary search state machine output voltage, and sets the 2 V reference to the adaptor. It programs the $V_{PP}$ voltage to each of five values in turn, and measures those values plus the state machine 2 V reference voltages, all of which are multiplexed to the neuron output line.

The $V_{GAIN}$ and $V_{REF}$ test verifies the proper operation of the logic that programs the $V_{GAIN}$, $V_{REF0}$, and $V_{REF1}$ signals. It first programs the $V_{REF1}$ line to each of five voltages in turn, then measures the value multiplexed to the neuron output line. It then repeats the process for the $V_{REF0}$ and $V_{GAIN}$ lines.

The perturbation logic test performs the following operations:

1. It programs the perturbation logic positive and negative lines.
2. It turns the low current perturbation logic select line on and off.
3. It reads a range of current levels, dependent upon the perturbation voltage level of the SMOP and SMON multiplexed logic signals.
4. It confirms the operation of the perturbation current sink logic.

The synapse current logic test verifies that the synapse current logic varies operation in concert with the synapse current offset programmable voltage. It also confirms that the synapse ADC logic is functional.

The sumout voltage measurement test exercises the sumout logic in the same manner as the synapse current logic test exercises the synapse current logic. It reads the voltage level through the multiplexer and tests for accuracy.

The firmware confirmation test verifies that the system can download firmware, add the programmed data, and calculate and compare the results with a stored checksum value.

The binary search state machine test verifies proper operation of the weight measurement logic. It comprehensively tests the target socket connections, VT threshold DAC, state machine DAC and comparator, and state machine logic.

Thus, a means and method for training a neural network is disclosed.

Although this invention has been shown in relation to a particular embodiment, it should not be considered so limited. Rather, it is limited only by the appended claims.

What is claimed is:

1. A network training device for training analog cells of a network, said training device comprising:
   a host computer;
   an adapter coupled to said host computer, said network being coupled to said adapter, said adapter including:
   (a) means for manipulating control lines in said network to select an analog cell, said means for manipulating control lines further including means for manipulating an analog cell address and means for manipulating an analog cell mode,
   (b) means for converting digital signals received from said host computer to an analog level for training said selected analog cell of said network,
   (c) means for setting said selected analog cell to said analog level,
   (d) means for converting analog levels received from said selected analog cell of said network to a digital signal for routing to said host computer,
   (e) means for measuring an analog level existing in said selected analog cell; and
   host computer software operably disposed within said host computer for controlling the operation of said adapter.

2. The network training device as claimed in claim 1 wherein said adapter further including isolation means for electrically isolating said network training device from said network.

3. The network training device as claimed in claim 1 wherein said adapter further including a network position testing means for determining the current physical orientation of said network as coupled to said adapter.

4. The network training device as claimed in claim 1 wherein said adapter further including a network power supply for supplying the current required by said network.

5. The network training device as claimed in claim 1 wherein said adapter further including logic means for local control of the operation of said adapter.

6. The network training device as claimed in claim 1 wherein said adapter further including reference voltage means providing a common reference voltage from which other analog levels are based.

7. The network training device as claimed in claim 1 further including a confidence test module for verifying the proper operation of said adapter, said confidence test module being coupled to said adapter in place of said network.

8. The neural network training device as claimed in claim 1 wherein said host computer software further including diagnostic software for verifying the proper operation of said adapter.

9. A device for training a non-volatile neural network, said non-volatile neural network having a plurality of synapses and a plurality of neurons, outputs of said synapses being coupled to inputs of said neurons, said device comprising:
   a host computer having a personal computer personal programmer (PCPP) interface;
   a generic universal programmer interface (GUPI) coupled to said PCPP interface of said host computer;
   an adapter coupled to said GUPI, said neural network being coupled to said adapter, said adapter including:
   (a) means for manipulating control lines in said neural network to select a neuron of said plurality of neurons,
   (a) means for manipulating control lines in said neural network to select a synapse of said plurality of synapses,
   (b) means for converting digital signals received from said host computer to an analog level for training said selected synapse of said neural network,
   (c) means for setting a weight of said selected synapse to said analog level,
   (d) means for converting analog levels received from said selected synapse of said neural network to a digital signal for routing to said host computer, (e) means for measuring said weight existing in said selected synapse; and host computer software operably disposed within said host computer for controlling the operation of said adapter.

10. The neural network training device as claimed in claim 9 wherein said adapter further including synapse current measurement means for measuring the current drop across a synapse.

11. The neural network training device as claimed in claim 9 wherein said adapter further including neuron sum measurement means for summing input voltage components of a selected neuron, said selected neuron receiving input voltage components from one or more synapses of said plurality of synapses.

12. The neutral network training device as claimed in claim 9 wherein said means for measuring a weight existing in said selected synapse further includes a binary searching means.

13. The neural network training device as claimed in claim 9 wherein said means for converting digital signals further includes a multiplexer.

14. The neural network training device as claimed in claim 9 wherein said means for converting analog levels further includes a voltage multiplexer.

15. The neural network training device as claimed in claim 9 wherein said adapter further including perturbation means for perturbing a selected neuron by shunting a measured amount of current to ground.

16. The neural network training device as claimed in claim 9 wherein said adapter further including means for setting a bias weight associated with said selected neuron.

17. The neural network training device as claimed in claim 9 wherein said adapter further including means for setting a gain voltage of a sigmoid associated with said neural network.

18. In a network training device including a host computer, an adapter coupled to said host computer, a network coupled to said adapter, and host computer software operably disposed within said host computer for controlling the operation of said adapter, a process for training analog cells of a network comprising the steps of:

(a) manipulating control lines in said network to select an analog cell, said step of manipulating control lines further including steps of manipulating an analog cell address and manipulating an analog cell mode;

(b) converting digital signals received from said host computer to an analog level for training said selected analog cell of said network;

(c) setting said selected analog cell to said analog level;

(d) converting analog levels received from said selected analog cell of said network to a digital signal for routing to said host computer; and (e) measuring an analog level existing in said selected analog cell.

19. A device for training a non-volatile neural network, said non-volatile neural network having a plurality of synapses and a plurality of neurons, each synapse of said plurality of synapses having at least one analog cell, outputs of said synapses being coupled to inputs of said neurons, said device comprising:

a host computer;

an adapter coupled to said host computer, said network being coupled to said adapter, said adapter including:

(a) means for manipulating control lines in said network to select an analog cell of a synapse, (b) means for converting digital signals received from said host computer to an analog level for training said selected analog cell of said synapse, (c) means for setting said selected analog cell to said analog level, (d) weight measurement circuitry for measuring an analog level existing in in said selected analog cell of said synapse; and (e) synapse current measurement circuitry for measuring an electrical current output by said synapse; and host computer software operably disposed within said host computer for controlling the operation of said adapter.

20. The device as claimed in claim 19 wherein said analog level set by said means for setting and said analog level measured by said weight measurement circuitry are used for initially training a different neural network.

* * * * *